US009460302B2

(12) United States Patent
Sathaye et al.

(10) Patent No.: US 9,460,302 B2
(45) Date of Patent: *Oct. 4, 2016

(54) METHOD AND SYSTEM FOR SHIELDING DATA IN TRANSIT AND DATA IN MEMORY

(71) Applicant: Cofactor Computing LLC, Austin, TX (US)

(72) Inventors: Sumedh Wasudeo Sathaye, Austin, TX (US); Nitin Sadashiv Deshmukh, Mumbai (IN)

(73) Assignee: Cofactor Computing LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/569,563

(22) Filed: Dec. 12, 2014

(65) Prior Publication Data
US 2015/0207785 A1 Jul. 23, 2015

Related U.S. Application Data

(63) Continuation-in-part of application No. 14/160,539, filed on Jan. 21, 2014.

(51) Int. Cl.
| G06F 21/00 | (2013.01) |
| G06F 21/62 | (2013.01) |
| G06F 21/60 | (2013.01) |
| H04L 9/08 | (2006.01) |
| H04L 29/06 | (2006.01) |

(52) U.S. Cl.
CPC ............. G06F 21/62 (2013.01); G06F 21/60 (2013.01); G06F 21/606 (2013.01); H04L 9/088 (2013.01); H04L 63/18 (2013.01); H04L 63/0272 (2013.01); H04L 63/0428 (2013.01); H04L 63/08 (2013.01)

(58) Field of Classification Search
CPC ................................. H04L 9/14; H04L 45/24
USPC ..................... 726/1–7, 26–30; 713/168–186; 380/255–30
See application file for complete search history.

(56) References Cited

U.S. PATENT DOCUMENTS

| 5,241,597 A | 8/1993 | Bright |
| 7,073,065 B2 | 7/2006 | Stone |
| 7,120,696 B1 | 10/2006 | Au et al. |

(Continued)

OTHER PUBLICATIONS

Backes, Michael, et al, "A Composable Cryptographic Library with Nested Operations.", Proceedings of the 10th ACM Conference on Computer and Communications Security, ACM, 2003.

*Primary Examiner* — Madhuri Herzog
(74) *Attorney, Agent, or Firm* — Forefront IP Lawgroup

(57) ABSTRACT

Described herein are techniques related to shielding data in transit and in memory. A method and system for shielding data in transit and in memory may include using a transformation knowledge key (TKK). For shielding data in transit, the TKK is configured to include a splitting algorithm component that is configured to split a message into N segments of shielded data and route the N segments via M communications paths, where M and N are integers greater than 1. For shielding data in memory, the memory is segmented into M memory blocks. The splitting algorithm component of the TKK is configured to split data into N segments of shielded data and store the N segments of shielded data in the M memory blocks. The TKK is reused to unshield and reconstruct the original message or the data from the N segments of shielded data.

35 Claims, 18 Drawing Sheets

(56) References Cited

U.S. PATENT DOCUMENTS

| | | |
|---|---|---|
| 7,234,057 B2 * | 6/2007 | Park .................... H04L 63/083 713/155 |
| 7,337,331 B2 | 2/2008 | Yoshida |
| 8,140,848 B2 | 3/2012 | Brundage et al. |
| 8,429,420 B1 * | 4/2013 | Melvin ................... G06F 21/79 711/163 |
| 8,504,847 B2 | 8/2013 | Resch et al. |
| 8,732,479 B1 | 5/2014 | Henriksen et al. |
| 2003/0223580 A1 | 12/2003 | Snell |
| 2006/0147041 A1 | 7/2006 | Claret et al. |
| 2007/0154018 A1 | 7/2007 | Watanabe |
| 2008/0040603 A1 * | 2/2008 | Stedron .................. H04L 9/088 713/166 |
| 2010/0008509 A1 | 1/2010 | Matsushita et al. |
| 2010/0268966 A1 | 10/2010 | Leggette et al. |
| 2010/0313036 A1 | 12/2010 | Lumb |
| 2011/0202755 A1 * | 8/2011 | Orsini ................... H04L 63/029 713/151 |
| 2012/0089885 A1 * | 4/2012 | Grube ................... H03M 13/05 714/752 |
| 2013/0152160 A1 * | 6/2013 | Smith ................... G06F 21/604 726/1 |
| 2014/0013112 A1 | 1/2014 | Cidon et al. |
| 2015/0149785 A1 | 5/2015 | Pickering et al. |
| 2015/0205939 A1 | 7/2015 | Sathaye et al. |
| 2015/0207625 A1 | 7/2015 | Sathaye et al. |

\* cited by examiner

1092

| NO. | OPERATOR TYPE | SUB-TYPE | PARAMETER | EXAMPLE |
|---|---|---|---|---|
| 1.1 | ENCRYPT (K) 1050 | SYMMETRIC | KEY-LENGTH, KEY | |
| 1.2 | | ASYMMETRIC | KEY-LENGTH, KEY-PAIR | |
| 2.1 | NOISE (N) 1060 | TOGGLE | BIT-GROUP, BIT-SELECTOR-MASK, | TOGGLE ALL/ODD/EVEN BITS, TOGGLE LOW/HIGH/MID NIBBLE, TOGGLE BITS 0167/0145/2367 |
| 2.2 | | SWAP | TRANSPARENT /MIRROR INTER-BYTE / INTRA-BYTE POSITION-SELECTOR | SWAP NIBBLE (7654:3210) SWAP INTER-NIBBLE (76:54,32:10) SWAP ADJACENT-BITS (7:6,5:4,3:2,1:0) SWAP CROSS NIBBLES SWAP ALTERNATE BYTES SWAP CHUNKS OF N-BYTES MIRROR NIBBLE (7654:0123) MIRROR INTER-NIBBLE (76:45,32:01) MIRROR BYTES W.R.T. MID-BYTE MIRROR AT EVERY STEP OF P |
| 2.3 | | ROTATE | LEFT/RIGHT/UP/DOWN, BYTE-CHUNK-SIZE N-BITS | ROTATE LEFT 3 TIMES OF 4-BYTE CHUNK ROTATE UPWARD 2 TIMES OF 6 BYTE CHUNK ROTATE DOWN 4 TIMES OF 10 BYTE CHUNK ROTATE ODD-BYTES 2 TIMES LEFT AND EVEN-BYTES 3-TIMES RIGHT ROTATE UP HIGH-NIBBLE TWICE OF 5-BYTE CHUNK |
| 2.4 | | XOR | KEY, BYTE-CHUNK-SIZE POSITION-SELECTOR | XOR ALL BYTES WITH KEY XOR 4-BYTE CHUNK WITH KEY AND KEY ROTATED LEFT 1-TIME FOR NEXT CHUNK XOR FIRST 8-BYTE CHUNK WITH KEY AND RESULT IS USED AS A KEY FOR NEXT CHUNK XOR 4-BYTE CHUNKS AT ODD POSITIONS |
| 3.1 | ORDER (O) 1080 | - | CHUNK-SIZE, SEQUENCE-CODE | ORDER 7-BYTE CHUNK BY BIG-ENDIAN ORDER 6-BYTE CHUNK BY SEQ:301245 FOR CHUNK-SIZE OF P, SEQUENCE CODE HAS P! PERMUTATIONS |
| 4.1 | SPLIT (S) 1070 | - | N-SEGMENTS, PROPORTION, | SPLIT INTO 5/95 FROM TOP SPLIT INTO 10/90, CUT AT OFFSET |

FIG. 10B

METHOD AND SYSTEM FOR SHIELDING DATA IN TRANSIT AND DATA IN MEMORY

CROSS REFERENCE TO RELATED APPLICATIONS

This application is a continuation-in-part of application Ser. No. 14/160,539 filed on Jan. 21, 2014.

The following related patent applications are hereby incorporated by reference:

U.S. patent application Ser. No. 14/160,539, filed on Jan. 21, 2014, entitled METHOD AND SYSTEM FOR SECURE DEPLOYMENT OF INFORMATION TECHNOLOGY (IT) SOLUTIONS IN UNTRUSTED ENVIRONMENTS and filed by Sumedh Wasudeo Sathaye and Nitin Sadashiv Deshmukh.

U.S. patent application Ser. No. 14/160,531, filed on Jan. 21, 2014, entitled METHOD AND SYSTEM FOR SHIELDING DATA IN UNTRUSTED ENVIRONMENTS and filed by Sumedh Wasudeo Sathaye and Nitin Sadashiv Deshmukh.

BACKGROUND

An information technology (IT) solution typically includes software, hardware, and service components or a combination thereof that work cooperatively to solve a specific problem or address a user need. Recently, technologies have arisen that allow Cloud service providers (CSP's) to offer cost-effective IT products and services such as virtualized, scalable data centers, unlimited range of applications, platforms and storage technologies, and others for a per use fee or a flat fee. As a result, many of these CSP's offer cost-effective outsourcing of IT operations to an enterprise that may be scaled instantly, seamlessly and on demand in a Cloud computing environment.

A typical in-house IT data center operates in a trusted and controlled environment. However, it may not be as cost-effective as CSP service and may not be easily scalable. Accordingly, there is a need for developing methods and systems for deploying secure IT solutions in a Cloud based unsecure environment.

BRIEF DESCRIPTION OF THE DRAWINGS

FIG. 10B illustrates in tabular form examples of shielding methods included in a library of shielding algorithms.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for deployment of IT solutions in untrusted environments having control in trusted environments.

Figure 1:
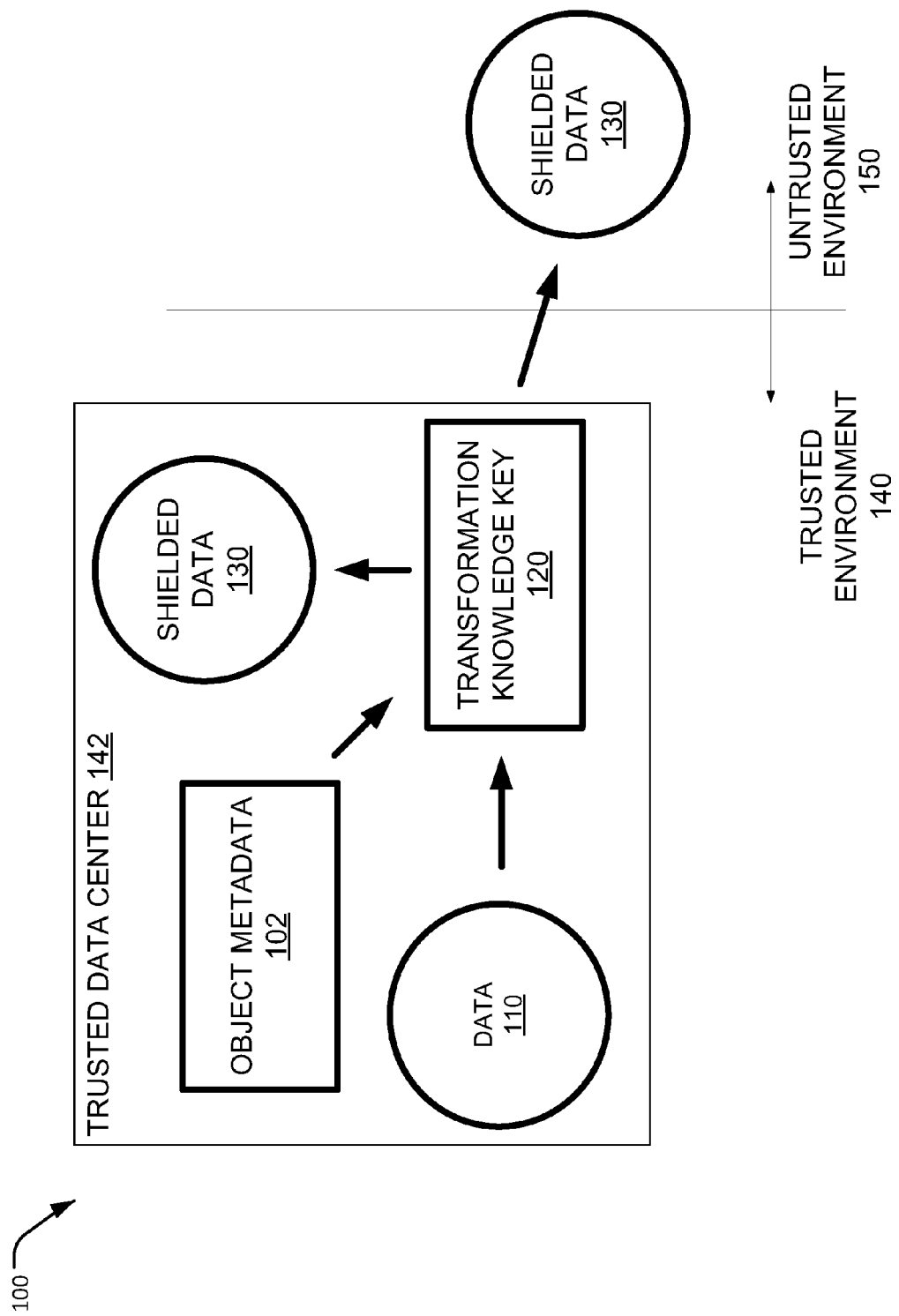
FIG. 1 illustrates a system for using a transformation knowledge key to shield data.

Example of a System for Using a Transformation Knowledge Key (TKK) Used to Shield Data FIG. 1 illustrates an example of a system 100 for using a transformation knowledge key (TKK) to shield data. In the context of IT solutions and as described herein, data 110 refers to any information processed or accessed by a processor. In its most basic form, data 110 may be binary and represented by bits (logical 0's and 1's). In addition to binary data, other types of data may include text, numeric, images, audio, video, objects, time, and numerous others. In many IT solutions, data owners may have a need to protect or shield the data 110 representing personal, sensitive, confidential, or trade secret information. Examples of IT solutions that may benefit from shielded data being stored in untrusted environments may include financial applications (e.g., banks, credit cards, equity markets, and others), healthcare applications (patient records, insurance, providers, employers, and others), corporate applications (confidential financial, legal, product related data), government applications (taxes, social security, defense, homeland security), and personal data applications.

Depending on the IT solution, the data 110 may originate and be stored in a trusted computing environment 140 (may also be referred to as a trusted environment) or may originate and be stored in an untrusted computing environment 150 (may also be referred to as an untrusted environment or a cloud environment). A trusted data center 142 may include one or more computing resources (not shown) residing in the trusted computing environment 140 that are configured to deliver IT solutions. An entity that owns or operates the data center 142 may assign an administrator to maintain complete control over the IT related processes and data.

In an implementation, additional characteristics of the trusted computing environment 140 may include: 1) ability to locate data and computation at all times (e.g., identify the physical location of all data and computation that is located in the trusted data center 142), 2) ability to configure dedicated computing resources for use by trusted users (e.g., configure resources such as physical storage devices, central processing units, physical network connections for internal use only and not shared with any user outside of the organization), 3) control of services provided via a set of request/response protocols offered to trusted users, 4) such that an administrator has full control over deployment of resources (e.g., space, power, physical security, heating/cooling, distribute computing, software and others).

In an implementation, additional characteristics of the untrusted computing environment 150 may include: 1) sharing of resources with third parties (e.g., parties external to the entity that owns the data 110) that typically provide lower costs and improved scalability, 2) ability to configure computing resources needed for use in a shared environment is controlled in real-time by a third party (e.g., a cloud services provider or a virtual private data center may dynamically re-allocate computing resources from one end user to another as needed), 3) control of services provided is via a published set of request/response protocols offered to any paid user, 4) owner or operator of the data 110 has no direct control over deployment of resources (e.g., space, power, physical security, heating/cooling, distribute computing, software and others), 5) multi-tenancy in any untrusted computing environment such as a cloud.

Although no computing environment may be guaranteed to be 100% safe from unwanted attacks at all the time and under any circumstance, an administrator may be able to configure and control a computing environment and designate it to be 'trusted', e.g., create the trusted data center 142 that has an acceptable level of risk in loss of the data no in proportion to the value of the data being shielded.

Although use of encrypted keys to secure data in an untrusted computing environment, e.g., a cloud environment, is well known, the security of the encrypted key used to encrypt the data is becoming increasingly unsafe. Size of the encryption key relative to the size of the data being shielded often becomes a large overhead cost resulting in higher price and lower performance in many IT applications.

In an implementation, a transformation knowledge key (TKK) 120 may be used to transform the data no into shielded data 130. The shielded data 130 may be stored in the trusted computing environment 140 or the untrusted computing environment 150 in a configurable manner to take advantage of the lower cost options. The transformation knowledge key 120 may be generated with one or more shielding algorithms (not shown) to shield the data. In an implementation, the transformation knowledge key 120 may be represented as a data byte string (not shown).

In an implementation, the transformation knowledge key 120 may be used to shield data at rest (e.g., long term data stored on a hard disc drive or magnetic media), data in motion, flight, or transit (e.g., data being exchanged between or within the trusted environment 140 and the untrusted environment iso), and data in solid state memory (e.g., transient, short term or transaction oriented data that is stored in volatile random access memory). In an implementation, a system and method for shielding data at rest is referred to as a K-STORE system, a system and method for shielding data in motion, flight, or transit is referred to as a K-COM system, and a system and method for shielding data in volatile memory is referred to as a K-MEM system. Details of the K-STORE system that is used to shield data at rest (e.g., long term data stored on a hard disc drive or magnetic media) is described with reference to U.S. patent application Ser. No. 14/160,539 and U.S. patent application Ser. No. 14/14,160,531, both being filed on Jan. 21, 2014 and incorporated herein by reference. Additional details of tools and techniques of the K-COM and K-MEM systems that use TKK's to shield data in motion, flight, or transit, and data in solid state memory respectively are described with reference to FIGS. 3, 4, 11, 12, 13A, 13B, 14 and 15.

An input to generate the transformation knowledge key 120 is data object metadata 102. The data object metadata 102 provides information such as type, size, position checksum, access control permissions, and other attributes of the data 110 to be shielded, and policies and parameters in force to manage the data no. Knowledge about the data object metadata 102 may influence the nature, type, size of the transformation knowledge key 120. Additional details of the transformation knowledge key 120 are described with reference to FIGS. 4 and 5.

It may also be challenging to generate an encryption key that is guaranteed to be 100% safe and secure from unwanted attacks at all the time and under any circumstance. A technique used to generate the transformation knowledge key 120 accepts this risk and mitigates it by dynamically changing the transformation knowledge key 120 in a configurable manner in the trusted computing environment 140. In addition, a unique instance of the transformation knowledge key 120 may be generated for each instance of storage of the shielded data. Thus loss of data due to a compromised instance of the transformation knowledge key 120 may be limited to loss of just one record of the data no. The techniques and systems described herein generate extraordinary levels of shielding for the data no, thereby making the data 110 suitable to be stored in shielded form in the untrusted environment 150 and benefit from the lower cost and improved scalability. Additional details of the transformation knowledge key 120 using one or more shielding algorithms are described with reference to FIGS. 4, 5, 8, and 9.

Figure 2:
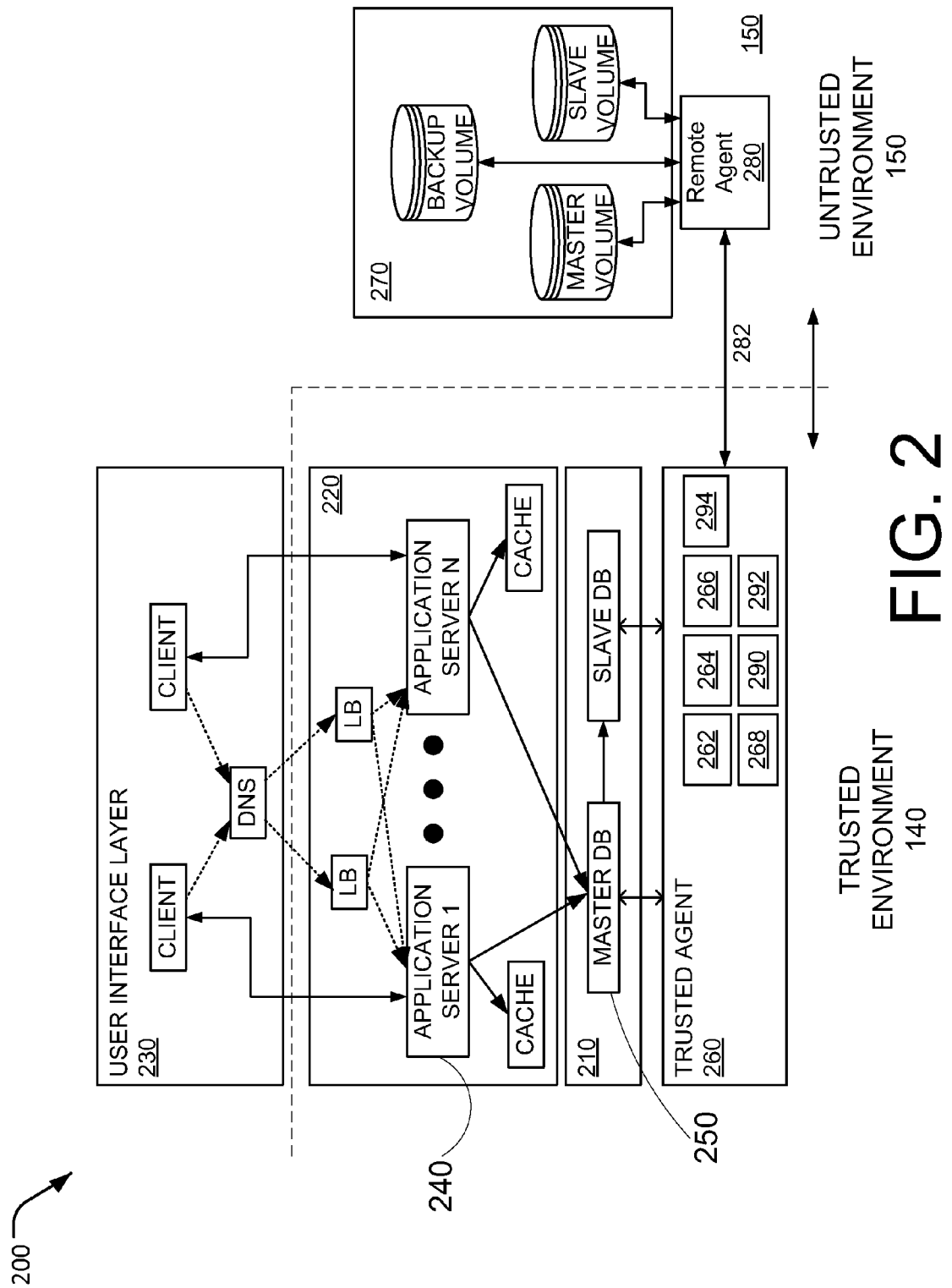
FIG. 2 illustrates an example of a system for storing shielded data in an untrusted environment.

Example of a System for Shielding Data for Storage in Untrusted Computing Environments FIG. 2 illustrates an example of a system 200 for storing shielded data in an untrusted environment.

With continuing reference to FIG. 2, the system 200 illustrates a 3-tier IT solution architecture for storing shielded data in an untrusted environment to reduce costs and improve scalability. In an implementation, the 3-tier architecture may include a database layer 210, an application layer 220, an user interface layer 230. The database layer 210 is typically a conventional data warehouse that makes use of clustered multi-processor systems configured with high availability/redundancy features such as master/slave storage volumes and back-up/archiving volumes.

The application layer 220 is typically comprised of one or more server computers, e.g., a web application server, and all application related executables reside in this tier. The user interface layer 230 is typically comprised of one or more client computers that may be configured to provide a user interface, e.g., a web browser, to access application features hosted by one or more of the application servers. Thus, the application layer 220 provides an interface between user interface layer 230 and the database layer 210. In an implementation, the application layer 220 may include cache memory to improve performance and support backup functions.

In an implementation, the system 200 is configured to include one or more components of the 3-tier IT solution architecture to exclusively reside in the trusted environment 140. The system 200 includes one or more instances of application servers 240, a database (DB) system 250, and a trusted agent 260 residing in the trusted environment 140. In addition, the system 200 is also configured to include data storage devices 270 and at least one remote agent shown as a remote agent 280 (that is configured as a remote storage agent) residing in the untrusted environment 150. Although at least one instance of the remote agent 280 is shown in the system 200, it is understood that the system 200 may be configured to include more than one instance of the remote agent 280. Similarly, although only one trusted agent 260 is shown, system 200 may be implemented with more than one trusted agents residing in the trusted environment 140. The trusted agent 260 is configured to communicate with the remote agent 280 via a secure communications link 282.

As described herein, the trusted agent 260 and the remote agent 280 may be configured to function as an agent for a user (e.g., entity, administrator, solution provider, data owner, and others) or another program to perform one or more functions in an autonomous and continuous manner. The trusted agent 260 and the remote agent 280 may implemented as hardware, software, firmware, or a combination thereof. In an implementation, the remote agent 280 is configured as a storage agent that is coupled to the data storage devices 270. The remote agent 280 may also be configured to perform additional functions that are described with reference to FIG. 3.

In an implementation, the trusted agent 260 includes at least one instance of the following components: a server 262, a data storage drive (referred to as a 'drive') 264, a database 266, a configurator 268, an administration module 290, and a policy engine 292.

The server 262 is the main engine of the system 200. It is configured to provide various services to other components included in the system 200. The services may be subscribed to and/or access via published APIs. The server 262 may be made available as a standalone process, a daemon, a dynamically linked library, a shared library, or it may be included and made part of other IT solution computation components.

The drive 264 provides shared storage services to components of the system 200 via the server 262. That is, system 200 components may read or write data to the drive 264 as if it is a direct access storage device (e.g., a hard disk). Services provided by the drive 264 may be exposed to the operating system (OS) via a device driver interface.

The database 266 is a private database designed to hold any and all information pertinent to storage function(s) in the system 200. For each piece of the data 110 to be shielded representing each instance of storage, the database 266 holds a unique handle, and a unique instance of the transformation knowledge key 120. It holds the knowledge (e.g., in the form of configuration data, logic, rules, objects, procedures, and others) of various locations (e.g., at the remote agent 280) which one or more segments of the shielded data 130 are stored. The database 266 also holds policies that control the behavior of each instance of storage, via execution in the policy engine 292. The database 266 also holds storage configuration information and parameter values. The database 266 may also hold user access and other privilege information such as credentials to access untrusted zone storage elements.

The policy engine 292 is operable to read, interpret, hold, and apply behavioral policies for the entire system 200. The policies (e.g., configured as rules) may be specified in a textual or other representations. The policies may be configured via several different methods, e.g. via uploaded policy files, or via using graphical user interfaces. The policy engine 292 may provide a policy capture feature that combines the configuration, administration, and policy capture functions that reside in and is accessible only from the trusted computing environment 140. In an implementation, only the server 262 may be accessible from outside of the trusted computing environment 140. As described earlier, services provided by the server 262 may be subscribed to and/or accessed via published API's.

The configurator 268 is a module that enables allows an IT solution provider or an administrator to specify the configuration parameters for the system 200. The administration module 290 enables an authorized user or administrator to perform administration functions such as access control, user add/remove/modify, plot trends of data access, and others. Other functions may include: (1) cost monitoring, (2) alarms & indicators, (3) event logging and action triggers, (4) co-ordination between system 200 instances residing in other trusted environments, and (5) data replication across other system 200 instances residing in other trusted environments. In an implementation, the configurator 268 may include multiple instances of system 200 instances to serve a single IT solution. Examples of configuration data controlled by the configuration module 268 may include: data storage locations, the control & scaling parameters that affect the behavior of solution on the untrusted environment 150, and others.

In an implementation, a data visualization (DV) agent 294 may be configured to enable a data owner, an authorized user, or an administrator to visualize the physical locations of all shielded data that may be deployed in the IT solution including shielded data in the trusted environment 140, the untrusted environment 150 or a combination thereof. Thus, the DV agent 294 may be configured to extend the amount of control the data owner, an authorized user, or an administrator may be able to exert on the shielded data by being able to pinpoint data locations on demand or displayed in real-time as a part of system monitoring function. The system monitoring function may include issuing alarms or alert messages when an unauthorized access to the shielded data 130 is detected. The DV agent 294, which is a component of the trusted agent 260, may be configured to be accessible only from the trusted environment 140.

In an implementation, the remote agent 280, which is configured as a remote storage agent, may act on two types of commands received from the server 262: (1) store commands, and (2) retrieve commands. The store commands include instructions for the remote agent 280 to store one or more segments of the shielded data 130. The remote agent 280 is configured to execute the instructions, resulting in storage of the shielded data 130 in the untrusted computing environment 150. The remote agent 280 may be configured to associate a unique identifier handle (e.g. a text string) with each segment of the shielded data 130. If asked to do so, the remote agent 280 returns the value of the identifier to the server 262, which may store it in the database 266.

With the retrieve commands, the remote agent 280 receives one or more identifier handles from the server 262. In response, remote agent 280 retrieves the associated segments of the shielded data 130 stored in the untrusted computing environment 150, and transfers them to the server 262 via communications link 282.

In an implementation, the trusted agent 260 may also include additional agents (not shown) such as: 1) an agent to keep track of user and application identities encoded in suitable format, 2) user access control agent that serves as a single authentication, and authorization mechanism for requests to access agents residing in the untrusted environment 150 and solution elements, 3) data transformer that transforms the data 110 in to the shielded data 130, 4) transformation knowledge key generator that generates the transformation knowledge key 120, 5) compliance and monitoring agent, and a communications agent to handle secure communications in trusted as well as untrusted environments. Additional details about the data transformer and the transformation knowledge key generator are described with reference to FIGS. 4 and 5.

It is understood that, depending on an application specification, a multi-tier IT solution architecture for shielding data may include more than 3-layers, e.g., a 5-layer IT solution. Conversely, it may implement it as a single layer IT solution.

Figure 3:
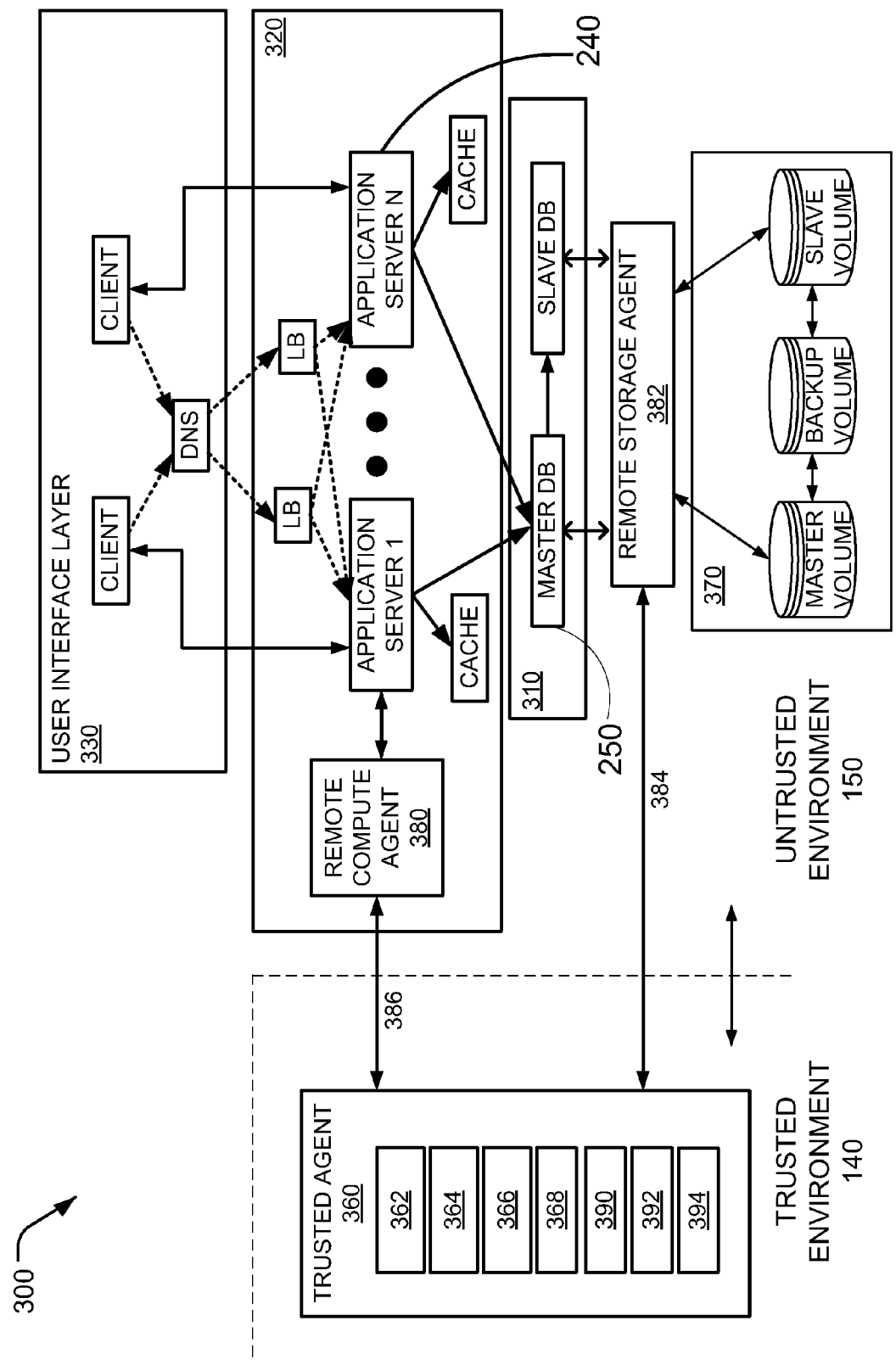
FIG. 3 illustrates an example of a system for deployment of computation and storage of data in an untrusted environment.

Example of a System for Shielding Data for Storage and Computation in Untrusted Computing Environments FIG. 3 illustrates an example of a system 300 for deployment of computation and storage of data in an untrusted environment. In an implementation, an entity may opt to not only distribute the shielded data 130 to reside in the untrusted computing environment 150 but the entity may also opt to distribute some of the computational functionality of the IT solution to further reduce costs and improve scalability.

In an implementation, the system 300 is configured to include one or more components of the 3-tier IT solution architecture including a database layer 310, an application layer 320, an a user interface layer 330 to exclusively reside in the untrusted environment 150 and the trusted agent 360 to reside exclusively in the trusted environment 140. The system 300 includes one or more application severs 362, a database (DB) system 364, an instance of the remote agent 180 configured as a remote compute agent 380 and an instance of the remote agent 180 configured as a remote storage agent 382. In addition, the system 300 is also configured to include data storage devices 370 coupled to the remote storage agent 382 residing in the untrusted environment 150.

The trusted agent 360 is configured to communicate with the remote storage agent 382 via a secure communications link 384 and with the remote compute agent 380 via a secure communications link 386. Although only one instance of the remote storage agent 382 and the remote compute agent 380 is shown in the system 300, it is understood that the system 300 may be configured to include more than one instance of the remote agents 280, 380, 382.

In an implementation, the trusted agent 360 is substantially similar to the trusted agent 260 described with reference to FIG. 2. Referring back to FIG. 3, similar to the trusted agent 260, the trusted agent 360 may include at least one instance of the following components: a server 362, a drive 364, a database 366, a configurator 368, an administration module 390, a policy engine 392, and a DV agent 394. Each component of the trusted agent 360 provides similar functionality and services as those provided by corresponding components of the trusted agent 260 described with reference to FIG. 2. In addition, the trusted agent 360 is configured to delegate some computational functions (e.g., related to client or user transactions) to the remote compute agent 380 for execution in the untrusted environment 150, thereby reducing costs and improving scalability.

The remote compute agent 380 may be configured as a single-purpose agent, or a unified multi-purpose super-agent performing functions complementary to that supported by the trusted agent 360. The IT solution and the underlying platform typically communicate with each other via well-known OS calls, e.g., disk file read/modify/delete, or network socket communications. The remote agent 380 may be configured to either (1) intercept the calls/communication between different layers of the IT solution, e.g., between the application server 240 and the database 210, or, (2) the application server 240 and/or the database 210 may be "aware", e.g., be explicitly configured to send all their communications through the remote compute agent 380. The remote compute agent 380 may communicate via a protocol well-understood by the application layer, and the database layer, and the related parts of the IT solution e.g. the data caching devices associated with the application layer. The one or more communication channels between the communication agents 1210 and 1220 are built with well-known and understood secure tunnels e.g. openssl tunnels, HTTP Secure tunnels, and similar others. Additional details of the communication channels between the communication agents 1210 and 1220 are described with reference to FIGS. 11, 12, 13A, and 13B.

The remote compute agent 380 may include an instance of the policy engine agent 392, which co-operating with the policy engine agent 392 holds, serves, and applies policies (rules) which control behavior of various parts of the platform apparatus residing in the untrusted environment 150. In an implementation, the remote compute agent 380 is operable to receive transformation logic data, e.g., a code dictionary, a set of code interpretation rules, and other, to interpret the transformation knowledge key 120, and the transformation knowledge key 120 itself. As described herein, the transformation logic data may include data associated with reconstruction of the data 110 from the shielded data, or rules or logic associated with the policy engine agent 392, and policies (rules) that may be used to un-shield the data 110 using the transformation knowledge key 120. In an implementation, the trusted agent 360 sends transformation logic data to the remote agent 380 to interpret the transformation knowledge key 120 and the transformation knowledge key itself.

Encoded in the policies, the remote agent 380 may be instructed to intercept specific data requested by the solution application, e.g., lookup of user directory during the authentication step of the IT solution. Upon matching intercepts, the remote agent 380 may execute actions specified in the policy. In an implementation, the actions may be as follows: (1) send a data lookup request to the trusted agent 360 using a handle (e.g., a user login name), (2a) receive un-shielded response data to pass along to the application server that requested it, or (2b) receive shielded data+transformation knowledge key 120 to be used to un-shield the data 110, which then will be passed along to the application server that requested it. Several types of data intercept, request, receive, use may be encoded in the policy engine 392. The interception of requests may be explicit (e.g. the application server is "aware" of these extra steps, or implicit (the application server speaks the regular API for access of these data which is converted into the intercept, request, receive use sequence by agent 380.

As described with reference to FIG. 1, the data 110 may originate in the trusted environment 140 or the untrusted environment 150. For example, in an IT solution for the insurance marketplace, a user operating in the user interface layer 330 may enter new insurance policy data on their web browser accessing a web site supported by the application layer 320. The new insurance policy data, which originates in the untrusted environment 150, may be transferred by the application server to the remote compute agent 380 to the trusted agent 360 for data transformation and storage.

Example of a System to Generate a Transformation Knowledge Key

Figure 4:
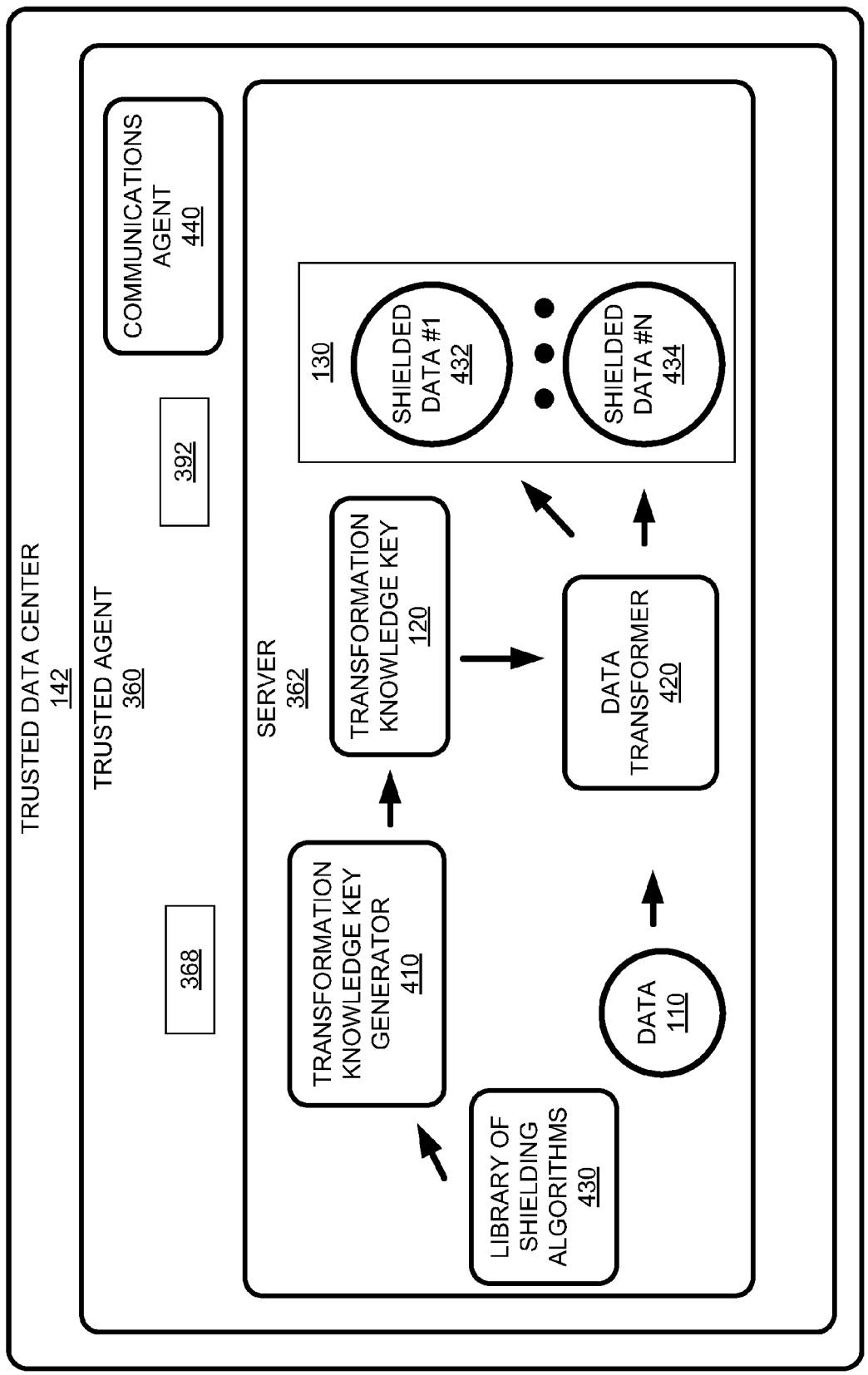
FIG. 4 illustrates components in a server that are configured to generate one or more instances of a transformation knowledge key.

Referring to FIGS. 3 and 4, illustrated are components in the server 362 that are configured to generate one or more instances of the transformation knowledge key 120. A data transformer 420 is operable to use the transformation knowledge key 120 to transform the data no into the shielded data 130. In an implementation, the shielded data 130 may be further shielded by splitting it into N segments of shielded data (432, 434), where N is a positive integer using the transformation knowledge key 120. In an implementation, the data transformer 420 uses a 'split-and-spread' technique to transform data no into the N segments of shielded data (432, 434). In an implementation, the at least one segment of the shielded data is the shielded data 130 and the N segments of shielded data (432, 434) may be represented as the N sub-segments of the at least one segment of the shielded data. Thus, a unique instance of the transformation knowledge key 120 may be used for each instance of data transformation of the data no to the shielded data 130. In an implementation, one or more instances of the transformation knowledge key 120 may be configured to be identical. In an implementation, one instance of the transformation knowledge key 120 may be the assigned to a client or an application requesting the trusted agent 360 to shield the data 110 or reconstruct the shielded data 130.

A transformation knowledge key generator 410 is operable to select at least two shielding algorithms (not shown) that are stored in a library of shielding algorithms 430 to generate one or more instances of the transformation knowledge key 120. In general, a greater level of shielding protection for the data 110 may be achieved by selecting more than 2 shielding algorithms but additional compute power may be needed. The transformation knowledge key generator 410 combines knowledge (in the form of configuration data, logic, rules, objects, procedures, and others) from the library of shielding algorithms 430, the policy engine 392 and the configurator 368 to generate the transformation knowledge key 120. A communications agent 440 residing in the trusted environment 140 may be configured to communicate information with other computing devices via the communications link 282.

In an implementation, to improve shielding of data in motion, flight or in transit, the communications agent 440 may be configured to establish N concurrently operable secure channels of communications (e.g., using openssl tunnels) via the communications links 386, 384 with one or more remote agents (e.g., the remote compute agent 380 and the remote storage agent 382), N being a positive integer. The policy engine 392 may be configured to select one or more of the N channels based on factors such as response time, latency, security of channel, and others. Thus, the trusted agent 360 and the remote agent 380 may be configured to communicate over more than one simultaneous communication channels so that sensitive data (such as the transformation knowledge key 120 or the data segment itself) can be transferred through untrusted environment 150 (e.g., the Internet) using a configurable split-communication technique. In an implementation, the splitting of the communication messages between N channels may be performed in accordance with one of the shielding algorithms selected from the library of shielding algorithms 430.

In an implementation, the trusted agent 360 and the remote agent 380 may include additional agents (not shown) that may apply the shielding techniques to shield data in transit. These additional agents, when presented with message data, may perform the following: (1) open N simultaneous communication links between them, N being a positive integer, the N links being operable on separate network ports in the respective agents, (2) the sender agent generates an instance of the transformation knowledge key 120 (TKK 120) for the message data, which may be called message TKK, (3) the sender agent applies the message TKK to the message data, (4) the application of the message TKK may transform the message data into one or more message data segments, (5) the sender agent may send the message TKK to the receiver agent on a separate, secure communication channel (e.g. encrypted OpenSSL channel, or a FIPS-148 channel), (6) the sender agent may send the message data segments over the multiple communication channels to the receiver agent, (7) the receiver agent after receiving the message data segments, applies the message TKK in reverse to the message data segments to reconstruct the original message. This implementation may use internal communication links (e.g. message pipes, message queues between processes), or external communication links (e.g. real network links).

In another implementation, the remote compute agent 380 may shield data in main memory of a system operating in the untrusted environment 150. At run time, when presented with data that will exclusively reside in main memory (e.g., in-memory databases, event log buffers, and other), it may request the trusted agent 360 to generate an instance of the transformation knowledge key 120 (TKK 120) for memory storage, e.g., a memory TKK for the data. The memory TKK may be generated for a large piece of data, or, one memory TKK may be generated per data sub-element, e.g., for each element of a data structure. Once the memory TKK's are generated by the trusted agent 360, they may be conveyed to the remote compute agent 380 over a separate, secure channel (e.g. encrypted OpenSSL channel, or a FIPS-148 channel). A data transformer instance in the remote compute agent 380 may then apply the memory TKK to the in-memory data, to shield it. It may then delete the memory TKK. When an application server or any other part of the IT solution stack requests the in-memory data, the data transformer may request the pertinent memory TKK from the trusted agent 360, upon receiving which, may apply it in reverse to un-shield the memory data and present it to the requesting part of the IT solution. In another implementation for shielding of in-memory data, one or more IT solution components may be programmed to invoke special data object class implementations (one each for data types, e.g. for integer data, floating-point data, character & string data, array data etc.), which, may (1) request the trusted agent for a memory TKK for the data element, (2) apply the memory TKK to the element and store it in-memory, and (3) on demand, fetch and reverse apply the memory TKK to supply the data element.

Example of a Transformation Knowledge Key

Figure 5:
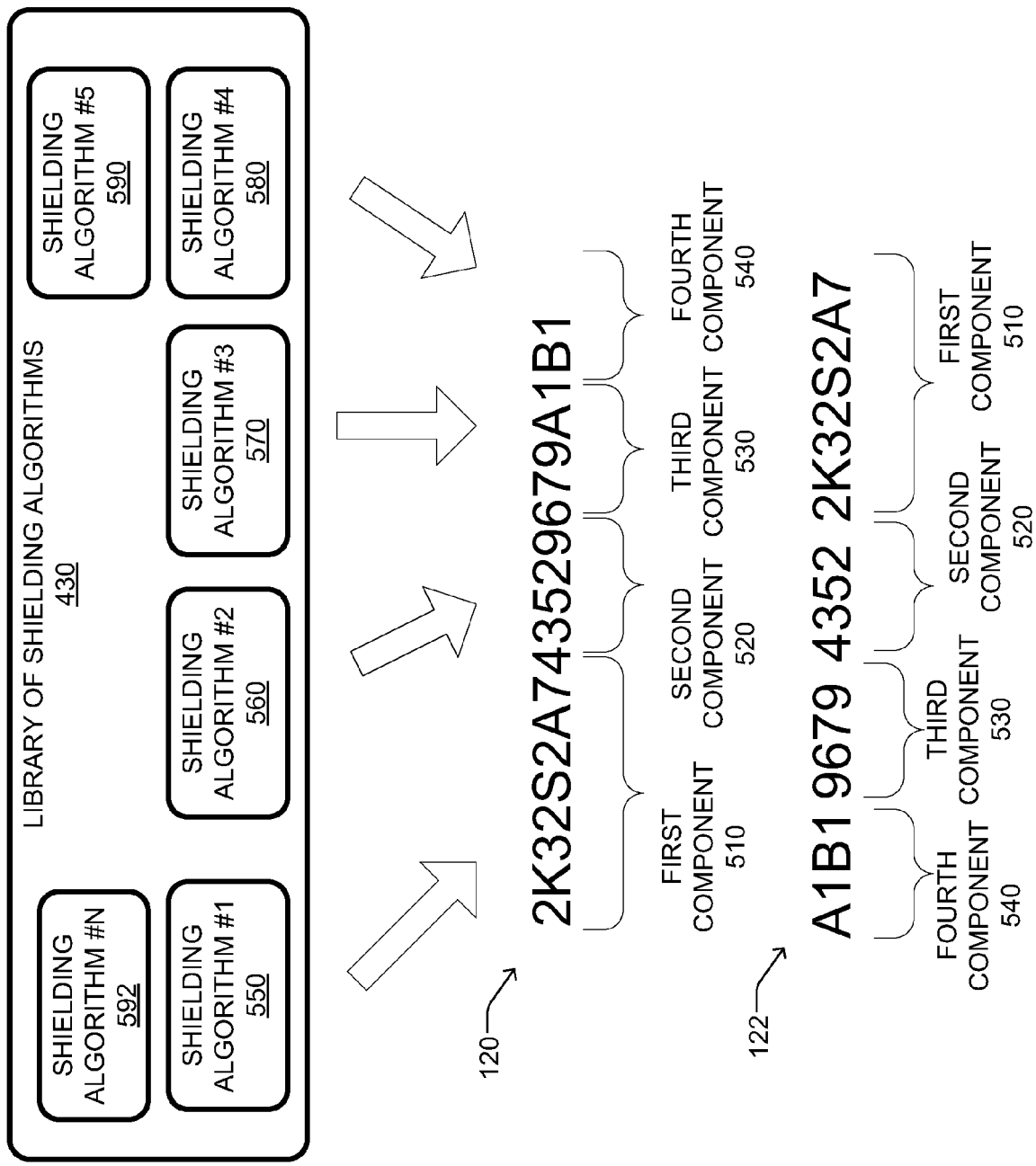
FIG. 5 illustrates a transformation knowledge key.

FIG. 5 illustrates a transformation knowledge key. In an implementation, the transformation knowledge key 120 is a data byte string that may include encoded information used in the data transformation process. In an implementation, the transformation knowledge key 120 may be generated by concatenating a configurable number of components, e.g., a first component 510, a second component 520, a third component 530, and a fourth component 540, into a data byte string. Although 4 components are shown, it is understood that at least two components may be concatenated to generate transformation knowledge key 120. In an implementation, the transformation knowledge key 120 may be generated by concatenating the same component more than once, e.g., the transformation knowledge key 120 may include 5 components (510, 520, 530, 540, 530).

Referring to FIGS. 4 and 5, each component is generated by selecting a shielding algorithm from the library of shielding algorithms 430. For example, the transformation knowledge key generator 410 may generate the first component 510 represented by an N-character code, e.g., 2K32S2A7, N being a positive integer by selecting a first shielding type algorithm 550 and combining knowledge from the policy engine 392 and the configurator 368. Similar procedure may be used by the transformation knowledge key generator 410 to generate the remaining components (520, 530, 540) using shielding algorithms (560, 570, 580) respectively. The number of characters used for encoding each component may vary and be different than or be the same as the N-character code. Additional details of the library of shielding algorithms 430 are described with reference to FIG. 10.

The transformation knowledge key 120 in the form a coded data byte string may be used as a recipe for shielding the data 110. In an implementation, the recipe may include coded information in the form of data, instructions, expressions, operations, parameters, methods or procedures for the data transformer 420 to shield the data 110 by transformation.

In an implementation, data transformation or a shielding process implemented in the data transformer 420 may support four transformation operator types—K, N, O and S, (where K, N, O, and S each correspond to one of the library of shielding algorithms 430). Additional details of the K, N, O and S transformation operator types is described with reference to FIGS. 9, 10A, and 10B. Each K, N, O transformation operator type is associated with an input data and an output data, whereas the S transformation operator type is associated one input data and more than one output data. Each transformation operator type may have associated parameters that may specify details of the data transformation process. All data transformations processes are reversible. That is, input data may be reconstructed based on output data for each transformation operator type and the transformation knowledge key 120.

In an implementation each component of the transformation knowledge key 120 may be constructed as a data byte string that may include the following coded information: Transformation Operator Type [Input data descriptor:IP1, Output data descriptor:OP1, Transformation Algorithm Type:P1, Transformation Algorithm Parameter:P2].

In an implementation, a component may be expressed as a transformation expression and may include one or more transformation operator types in the configurable order (e.g., (K, N), (K, N, O, N, S), and others). A first level of transformation expression that operates on the data 110 includes at least two transformation operator types.

In an implementation, the coded data byte string may include nested codes, e.g., in instances when the data 110 is shielded and then split into multiple segments and each segment is shielded further by another separate data transformation. In an implementation, the transformation knowledge key 120 may include a nested instance of another transformation knowledge key (not shown). For example, a splitting algorithm may split data into 2 segments and another splitting algorithm may further split one of the 2 previously split segments into 2 sub-segments. A nested example of a transformation expression may include: (K,N, S((K1,N1), (K2,N2))). The nesting feature of transformation expression and establishing the configurable order of transformation operators within each transformation expression generates extraordinary shielding protection for the data 110.

The transformation knowledge key 120 is an encoded representation of the transformation expression. The transformation knowledge key 120 is therefore an ordered sequence of operations that are progressively performed by the data transformer 420 for shielding the data no. Additional details of nested instances of the transformation knowledge key 120 are described with reference to FIG. 9.

The coded information included in the transformation knowledge key 120 may be processed, parsed, interpreted or acted on by the data transformer 420 in the configurable order (or in reverse of the configurable order when reconstructing the data 110 from the shielded data 130). Thus, the code corresponding to each component of the transformation knowledge key 120 is used by the data transformer 420 to transform the data 110 into the shielded data 130 that may be split into N segments of shielded data (432, 434), wherein N is a positive integer.

The order of concatenation of the components to form the transformation knowledge key 120 or another instance 122 of the transformation knowledge key 120 may be configurable and defines the configurable order. For example, the configurable order may be selected to be a forward sequence of the components (e.g., 510, 520, 530, 540), a reverse sequence of the components (e.g., 540, 530, 520, 510) or any other random sequence of the components (e.g., 510, 530, 540, 520). Although the transformation knowledge key 120 is shown to have 4 components, it is understood that systems having a transformation knowledge key having more number of components or less than 4 components but at least two components may be configured.

In an implementation, transformation of the data 130 into N segments of shielded data (432, 434) may be performed in the configurable order of the components of the transformation knowledge key 120. The data transformation may be processed in a cascade arrangement of the components where output of a current component is provided as an input to the next component. For example, a data transformation process for shielding the data no using the transformation knowledge key 120 having 4 components (e.g., 510, 520, 530, 540) may include generating partially shielded data (or intermediate data) at the end of processing first 3 of the 4 components and the generating the N segments of shielded data (432, 434) after processing the last component in the configurable order.

In an implementation, the data transformer 420 may perform shielding of the data no in a sequence that includes at least 2 selectable components from the 4 components (510, 520, 530, 540) of the transformation knowledge key 120. Additional details of the data transformer 420 using a 2-component and a 4-component cascaded arrangement for shielding the data no is described with reference to FIGS. 8 and 9.

Referring back to FIGS. 4 and 5, in response to a request, the data transformer 420 is also operable to gather the N segments of shielded data (432, 434) that may be distributed across one or more remote agents for storage and reconstruct the data 110 from the N segments of shielded data (432, 434) using a corresponding one of the transformation knowledge key 120. That is, the data transformer 420 is also configured to process codes making up the transformation knowledge key 120 in an order that is reverse of the configurable order to reconstruct the data 110 from the N segments of shielded data (432, 434). Additional details of the shielding algorithms and the data transformation process to generate the shielded data 130 and reconstruct the data 110 are described with reference to FIGS. 6-10.

Examples of Deployment of Shielded Data in Untrusted Environment

Figure 6:
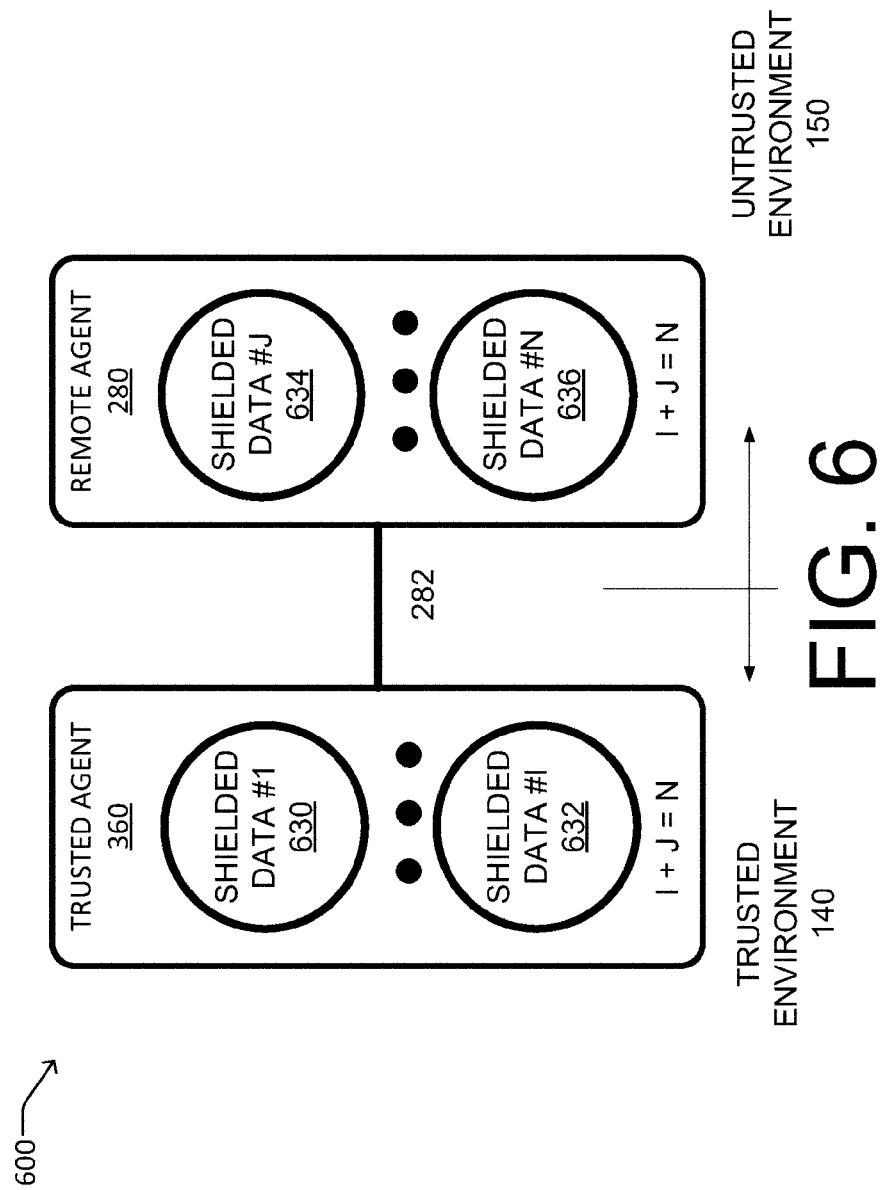
FIG. 6 illustrates a system to deploy shielded data in trusted and untrusted environments.

FIG. 6 illustrates a system to deploy shielded data in trusted and untrusted environments. In an embodiment, the N segments of shielded data (432, 434) may be distributed in accordance with a distribution shielding algorithm (not shown) that is included in the library of shielding algorithms 430. The trusted agent 360 may be configured to store I ones (630, 632) of the N segments of shielded data (432, 434) in the trusted environment 140 and the remote agent 280 may be configured to store J ones (634, 636) of the N segments of the shielded data (432, 434) in the untrusted environment 150, where I+J=N, and where I, and J are non-negative integers. The specific values of I and J selected may depend on the policy and configuration of the distribution shielding algorithm.

In an implementation, the data transformer 420 is operable to reconstruct the data 110 using the transformation knowledge key 120 and data from I ones (630, 632) of the N segments of shielded data (432, 434) stored in the trusted environment 140 and the J ones (634, 636) of the N segments of shielded data (432, 434) received from the remote agent 280 via the communications link 282.

Figure 7:
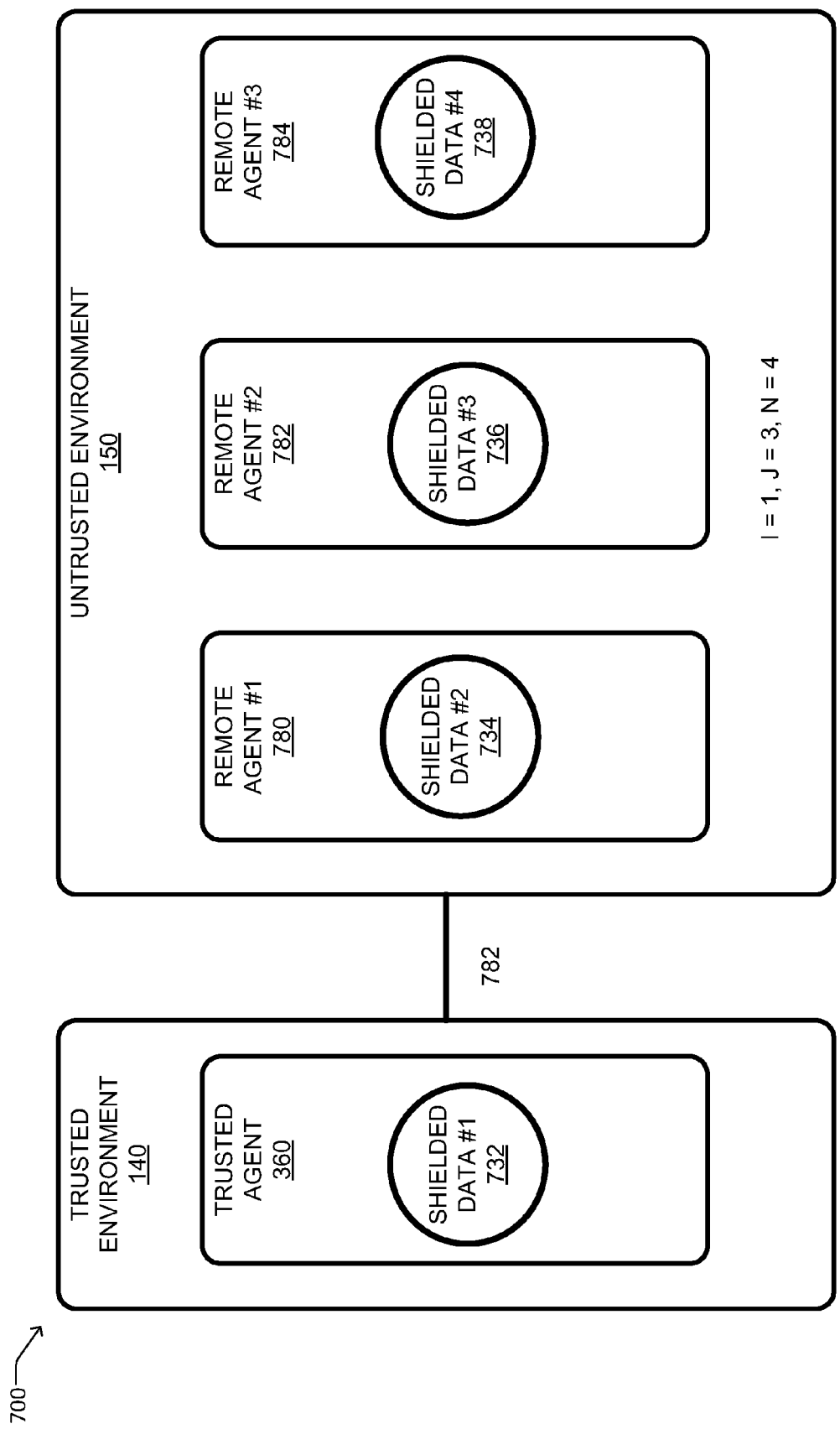
FIG. 7 illustrates a system implemented with a trusted agent and (N−I) remote agents for storing N segments of shielded data.

FIG. 7 illustrates a system 700 implemented with the trusted agent 360 and (N−I) remote agents (780, 782, 784) for storing N segments of shielded data (432, 434). In this example, I=1, J=3, and N=4. That is, the N segments of shielded data (432, 434) include 4 segments, one of the 4 segments is stored in the trusted agent 360, and 3 of the 4 segments are stored in the untrusted environment 150. A first shielded data segment 732 may be stored in the trusted agent 360, and each one of the 3 remote agents (780, 782, 784) may be configured to store a corresponding one of the remaining 3 shielded data segments (734, 736, 738) using the distribution shielding algorithm described with reference to FIG. 6. Referring to FIGS. 6 and 7, in an implementation, the distribution shielding algorithm may be configured to randomize the order of storing the N segments of shielded data (432, 434) by selecting any one the remote agents (780, 782, 784) for storage.

Depending on the distribution policy configured in the policy engine 392, other permutations and combinations of storing the 3 shielded data segments (734, 736, 738) may be possible, e.g., 0 in the trusted agent 360 and 4 in the 3 remote agents (780, 782, 784) or 2 in the trusted agent 360 and 2 in the 3 remote agents (780, 782, 784), and others. Each one of the 3 remote agents (780, 782, 784) may be configured to store 0 or more ones of the N segments of shielded data (432, 434) as directed by the trusted agent 360.

Figure 8:
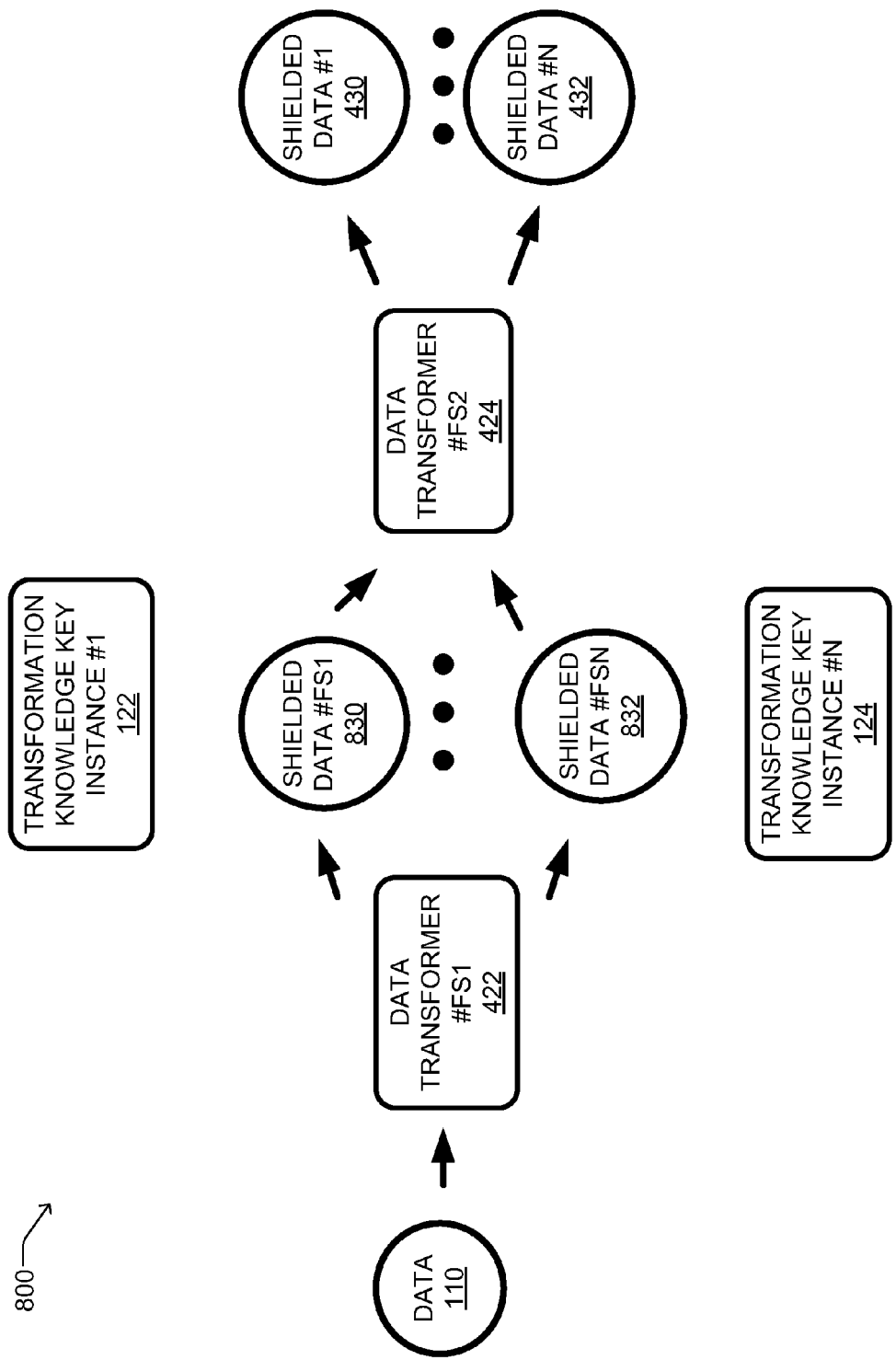
FIG. 8 illustrates a system to shield data into N segments using a 2-component data transformation process.

Example of Data Transformation Process to Transform Data Into Shielded Data Using Two Components FIG. 8 illustrates a system to shield data into N segments using a 2-component data transformation process. In an implementation, system 800 includes the data transformer 420 that is configured to transform data using 2 components that make up the transformation knowledge key 120. The data transformer 420 may be configured to include a first data transformer 422 operable to process codes included in a first one of the two components and a second data transformer 424 operable to process codes included in a second one of the two components. In an implementation, the first component may be configured to include a code to perform a split transformation operation. The splitting operation may be performed in accordance with an N-character code of a component (e.g., first one of 2 components) generated by at least one of the shielding algorithms stored in the library of shielding algorithms 430. Thus, the first data transformer 422 is operable to transform the data 110 by splitting it into N segments of partially shielded data (830, 832) using an instance of the transformation knowledge key 120.

The second data transformer 424 is operable to transform the N segments of partially shielded data (830, 832) into the N segments of shielded data (432, 434) using the transformation knowledge key 120. The data transformation operation may process an M-digit code (M is a positive integer) of a component (e.g., second one of 2 components generated by at least one of the shielding algorithms stored in the library of shielding algorithms 430) to further shield the N segments of partially shielded data (830, 832).

In an implementation, the system 800 may be configured with a single instance of the data transformer 420 that operates on the two components. For example, a first iteration of the data transformer 420 may process the first component and feed the results of the first iteration of data transformation back to its input and apply the second iteration of data transformation to the results, thus achieving the same result as the first and second data transformer (422, 424).

In an implementation, the system 800 may be used to reconstruct the data 110 from the N segments of shielded data (432, 434) using a corresponding instance of the transformation knowledge key 120.

Figure 9:
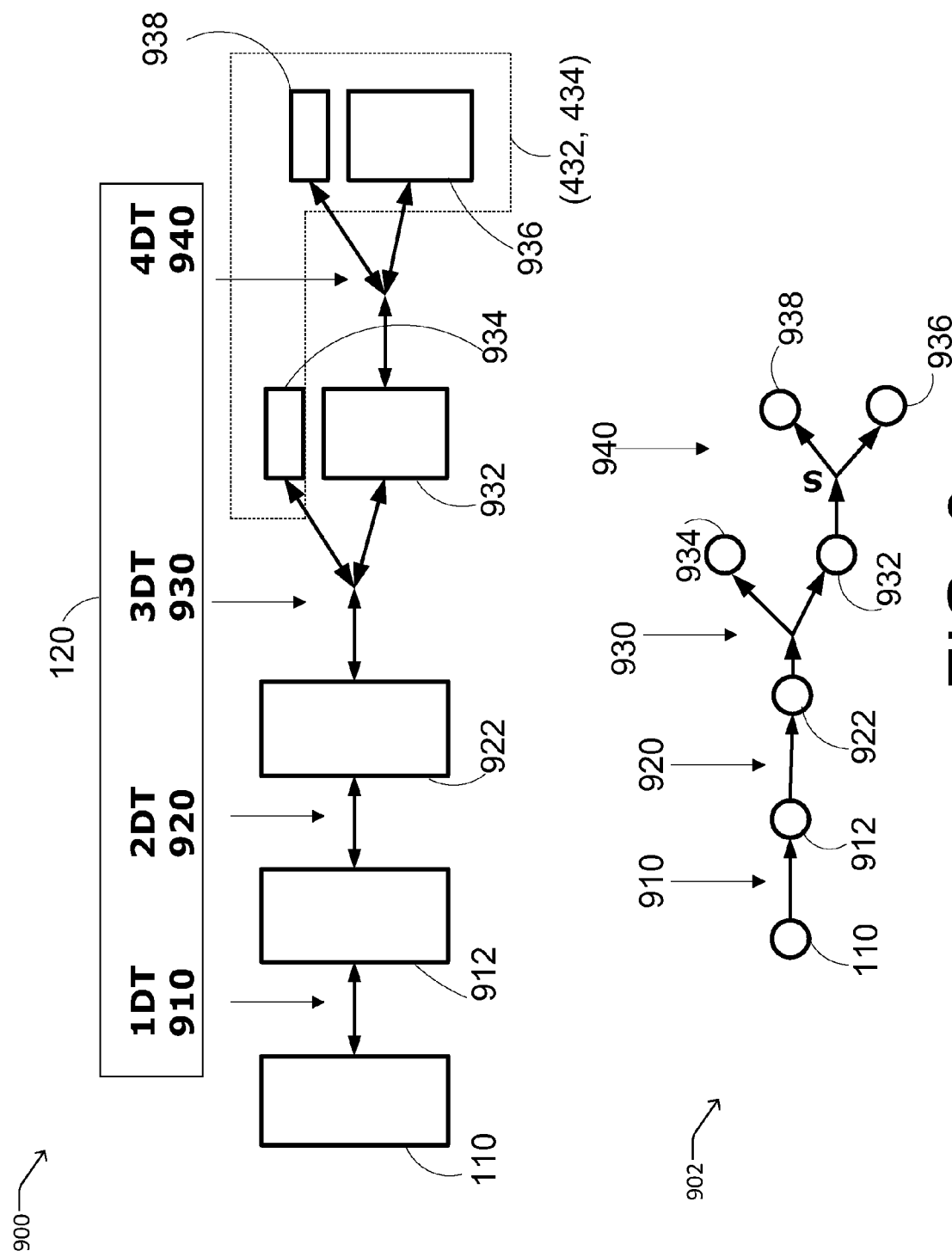
FIG. 9 illustrates a system to shield data into N segments using a 4-component data transformation process.

Example of Data Transformation Process to Transform Data Into Shielded Data Using 4 Components FIG. 9 illustrates a system to shield data into N segments using a 4-component data transformation process. In an implementation, system 900 includes the data transformer 420 that is configured to transform the data 110 in to the N segments of the shielded data (432, 434, shown to include 934, 936, 938) using 4 components (e.g., 510, 520, 530, 540). In this implementation, the transformation knowledge key 120 is configured to include 4 components arranged in the configurable order, as described with reference to FIG. 5.

Referring back to FIG. 9, in an implementation, the data transformer 420 is configured in a cascade arrangement to include a first data transformer (1DT) 910, a second data transformer (2DT) 920, a third data transformer (3DT) 930, and a fourth data transformer (4DT) 940 that are operable to transform data using codes included in the 4 components (e.g., 510, 520, 530, 540) respectively. The 1DT 910 is operable to transform the data 110 in to a first partially shielded data 912 by applying a P-digit code (P is a positive integer) of a component (e.g., first one of 4 components) generated by at least one of the shielding algorithms stored in the library of shielding algorithms 430. The partially shielded output of the 1DT 910 is provided as an input to the next stage, e.g., the 2DT 92 for further shielding.

The 2DT 920 may perform a data transformation operation to generate a second partially shielded data 922 in accordance with an M-digit code (M is a positive integer) of a component (e.g., second one of 4 components) generated by at least one of the shielding algorithms stored in the library of shielding algorithms 430.

In an implementation, the third component (e.g., third one of 4 components) may be configured to include a code to perform a split transformation operation. The splitting operation may be performed in accordance with a P-digit code of the third component generated by at least one of the shielding algorithms stored in the library of shielding algorithms 430. The 3DT 930 is configured to process the splitting operation to further shield the second partially shielded data 922 into a first one of a third partially shielded data 934 and a second one of a third partially shielded data 932.

In an implementation, to increase the level of shielding protection, nested codes may be configured in one or more of the components of the transformation knowledge key 120. In an implementation data byte string may include nested codes that may be configured to include the following information: Transformation Operator Type1 [Input data descriptor:P1, Output data descriptor:P1, {Transformation Operator Type2 (Input data descriptor:P1, Output data:P2, Transformation Algorithm Type:P2A, Transformation Algorithm Parameter:P2P)}, Transformation Algorithm Type: P1A, Transformation Algorithm Parameter: P2A].

The 4DT 940 is operable to perform another splitting operation on the second one of the third partially shielded data 932. Since the splitting operation is not performed on the first one of the third partially shielded data 934, it represents a leaf node or an end node of a configurable order 902. Some data transformation operations may be performed in parallel (e.g., generation of the shielded data points (936, 938). Thus, the N segments of shielded data (432, 434) may be represented as a collection of leaf nodes of the configurable order 902 that includes the first one of the third partially shielded data 934. The second one of the third partially shielded data 932 is split into 2 leaf nodes (936, 938) included in the N segments of shielded data (432, 434). In an implementation, a transformation path from the data 110 to a leaf node, (e.g., 934, 936, or 938) uses an instance of the transformation knowledge key 120.

In an implementation, 1DT 910 may perform data transformation encoded as K(I/P: 110, O/P: 912, P0:AES-Sym, P1:AES-Key), the 2DT 920 may perform data transformation encoded as N(I/P: 912, O/P: 922, P0: Toggle, P1:Odd), the 3DT 930 may perform data transformation encoded as S(I/P: 922, O/P: 934, 932, P0: 7%, P1: @Top), and 4DT 940 may perform data transformation encoded as S(I/P: 932, O/P: 938, 936, P0: XOR, P1: #25). Since O/P: 932 is split for again nested codes may be used and the encoded data byte string representing the transformation knowledge key 120 may be expressed as: [K(I/P: 110, O/P: 912, P0:AES-Sym, P1:AES-Key), N(I/P: 912, O/P: 922, P0: Toggle, P1:Odd), S(I/P: 922, O/P: 934, [S(I/P: 932, O/P: 938, 936, P0: XOR, P1: #25)], P0: 7%, P1: @Top)].

In an implementation, the system 900 may be used to reconstruct the data 110 from the N segments of shielded data (432, 434, shown to include 934, 936, 938) using N corresponding instances (122, 124) of the transformation knowledge key 120.

It is understood that, if the transformation knowledge key 120 is configured to include M components, M being a positive integer, the order of processing the M components to perform the data transformation is forward from left to right as defined in the configurable order. When a splitting component appears, it leads to a nested instance of the transformation knowledge key 120, which is interpreted and applied in exactly the same manner. Similarly, a reverse transformation (e.g., reconstructing or un-shielding) is processed from right to left, looking for the first "outermost" component from right, interpreting it, and applying the un-shielding transformations specified within. If the "outermost" component is a splitting component, then its nested transformation knowledge key are interpreted first and applied in reverse.

Example of Configuring a Library of Shielding Algorithms

Figure 10A:
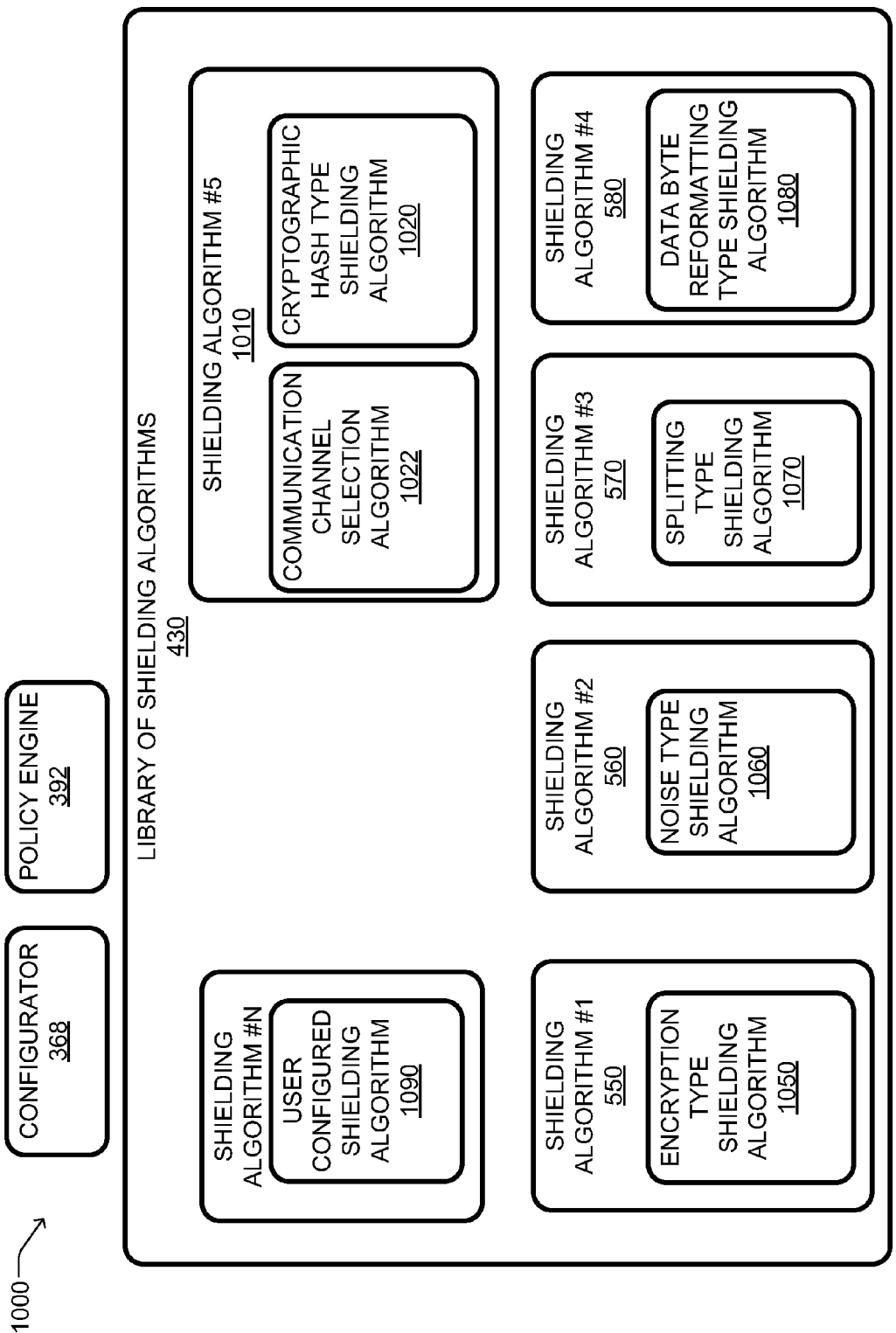
FIG. 10A illustrates a system to configure a library of shielding algorithms.

FIG. 10A illustrates a system to configure a library of shielding algorithms. In an implementation, the system 1000 may be configured to include the library of shielding algorithms 430 working co-operatively with the configurator 368 and the policy engine 392 components of the trusted agent 360. The policy engine 392 and the configurator 368 may be used to build and manage the library of shielding algorithms 430. The library of shielding algorithms 430 may include multiple shielding algorithms (550, 560, 570, 580, 590, 592).

In an implementation, the first shielding algorithm 550 may include an encryption type shielding algorithm 1050 (described earlier with reference to FIG. 5 as a transformation operator type K) that may be configured to generate the first component 510 of the transformation knowledge key 120. The second shielding algorithm 560 may include a noise insertion type algorithm 1060 (described earlier with reference to FIG. 5 as a transformation operator type N) configured to generate the second component 520 of the transformation knowledge key 120. The third shielding algorithm 570 may include a data splitting type algorithm 1070 (described earlier with reference to FIG. 5 as a transformation operator type S) configured to generate the third component 530 of the transformation knowledge key 120. The fourth shielding algorithm 580 may include the data byte reformatting type algorithm 1080 (described earlier with reference to FIG. 5 as a transformation operator type O) configured to generate the fourth component 540 of the transformation knowledge key 120.

In an implementation, codes for shielding algorithms (e.g., transformation operator types K, N, O, S) and their parameters may configurable by an authorized user or administrator so that interpretation of keys may be different and unique to each IT solution. By assigning codes to algorithms and parameters, an administrator or a data owner may define proprietary mnemonic from the library of algorithms 430. Then, the transformation key generator 410 may generate for the IT solution, unique instances of the transformation knowledge key 120 for shielding the data 110.

In an implementation, the level of shielding protection of the data 110 may be further enhanced by adding a cryptographic hash type shielding algorithm 1020, a communication channel selection algorithm 1022, and/or a user configured shielding algorithm 1090 for ultimate control of generating shielded data that is suitable for storage in untrusted environments 150. An example of a user configured shielding algorithm 1090 may include configuring an N-dimensional matrix that has a user configured bit pattern for each of the matrix elements.

In an implementation, the encryption type algorithm 1050 is an Advanced Encryption Standard (AES), the AES using a symmetric key, where the encryption type algorithm 1050 independently controls a shielding factor by configuring the symmetric key having S-bits, S being a positive integer. In an implementation, the encryption type algorithm 1050 may use asymmetric keys, where the encryption type algorithm independently controls a shielding factor by configuring at least one of the asymmetric keys having A-bits, A being a positive integer. Other well-known encryption type algorithms (e.g., DES, RSA, HASH, MD5, AES, SHA-1, HMAC, and others) may be used.

In an implementation, the noise insertion type algorithm 1060 is configured to shield the data by inserting a noise pattern in the data in accordance with coded instructions included in the second component 520.

In an implementation, the noise pattern is configured to be one of a toggle pattern, a swap pattern, a rotation pattern, and a XOR pattern, each member of the noise pattern corresponding to a coded instruction.

In an implementation, the data splitting type algorithm 1070 is configured to split the data 110 into N segments of partially shielded data (432, 434). The splitting operation may be configured to be placed in any order in the configurable order, e.g., the third component may be selected in the configurable order to be different than the last, N being a positive integer.

In an implementation, the data byte reformatting type algorithm 1080 is configured to shield the data by changing data byte sequence in accordance with coded instructions in the transformation knowledge key 120, where the data byte reformatting type algorithm 1080 is selectable to be at least one of big-endian, small-endian, origin offset or any one of P-factorial permutations where P is an integer less than or equal to size of the data.

FIG. 10B illustrates in tabular form examples of shielding methods included in a library of shielding algorithms. In an implementation, Table T 1092 lists codes and parameters that may be selected for various shielding algorithms 1050, 1060, 1070 and 1080 (e.g., K, N, S, O transformation operator types). All parameters for K, N, O, S methods may be randomly selectable in bounded limits, e.g., may be based on a random number generator or a time of day based selection. Examples of sequence generation may include arithmetic progression, geometric progression, prime numbers, Fibonacci/Lucas sequence, Recaman's sequence, polygonal numbers (e.g., triangular, pentagonal, hexagonal and others), Morse code, and others. The sequence generation methods may be used for Noise insertion (N), Split segment (S) selection, Ordering (O) selection, or for other types of data transformations described herein.

Figure 11:
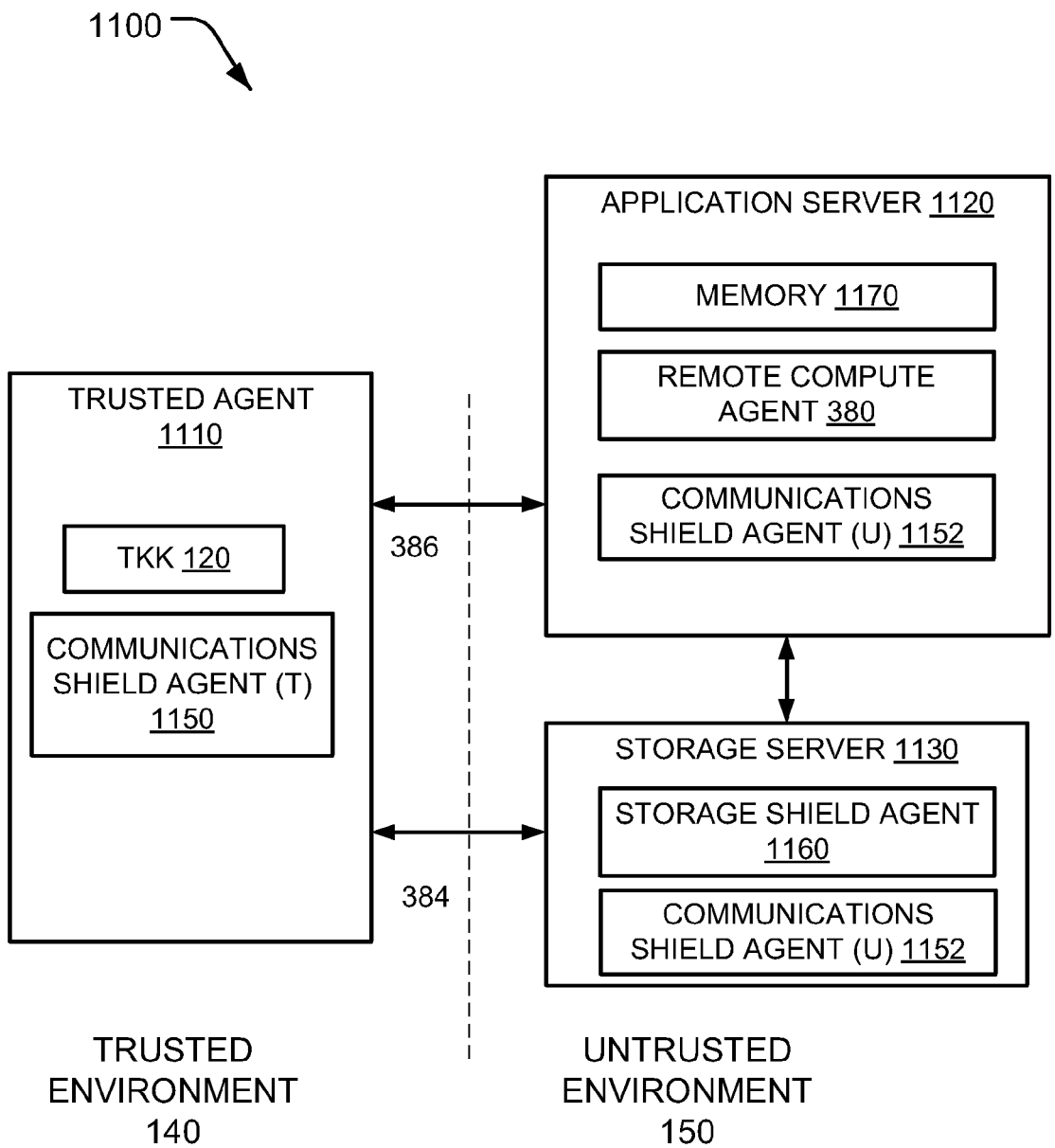
FIG. 11 illustrates a transformation knowledge key (TKK) based system to shield data in memory, data in transit, and data at rest.

Example of a Transformation Knowledge Key (TKK) Based System to Shield Data in Memory, Data in Transit, and Data at Rest FIG. 11 illustrates a simplified block diagram of a system 1100 to concurrently shield data in memory, data in transit and data at rest. In an implementation, the system 1100 may include a trusted agent 1110, an application server 1120, and a storage server 1130. The trusted agent 1110, which is similar to the trusted agent 360 described with reference to FIG. 3 or the trusted agent 260 described with reference to FIG. 2, is configured to operate in the trusted environment 140.

The trusted agent 1110 is configured to generate one or more instances of the transformation knowledge key 120. The application server 1120 and the storage server 1130 are configured to operate in the untrusted environment 150. The application server 1120 includes the remote compute agent 380 configured to shield data in memory 1170 using the TKK 120, a communications shield agent (U) 1152 configured to shield data in transit using the TKK 120, and the storage server 1130 includes a storage shield agent 1160 configured to shield data at rest using the TKK 120.

Paired with the communications shield agent (U) 1152 is a communications shield agent (T) 1150 hosted by the trusted agent 1110. In an implementation, the storage shield agent 1160 is similar to the remote storage agent 382 described with reference to FIG. 3. Additional details of the communications shield agents (T) and (U) 1150, 1152 are described with reference to FIGS. 12, 13A and 13B. Additional details of the remote compute agent 380 are described with reference to FIG. 14.

Figure 12:
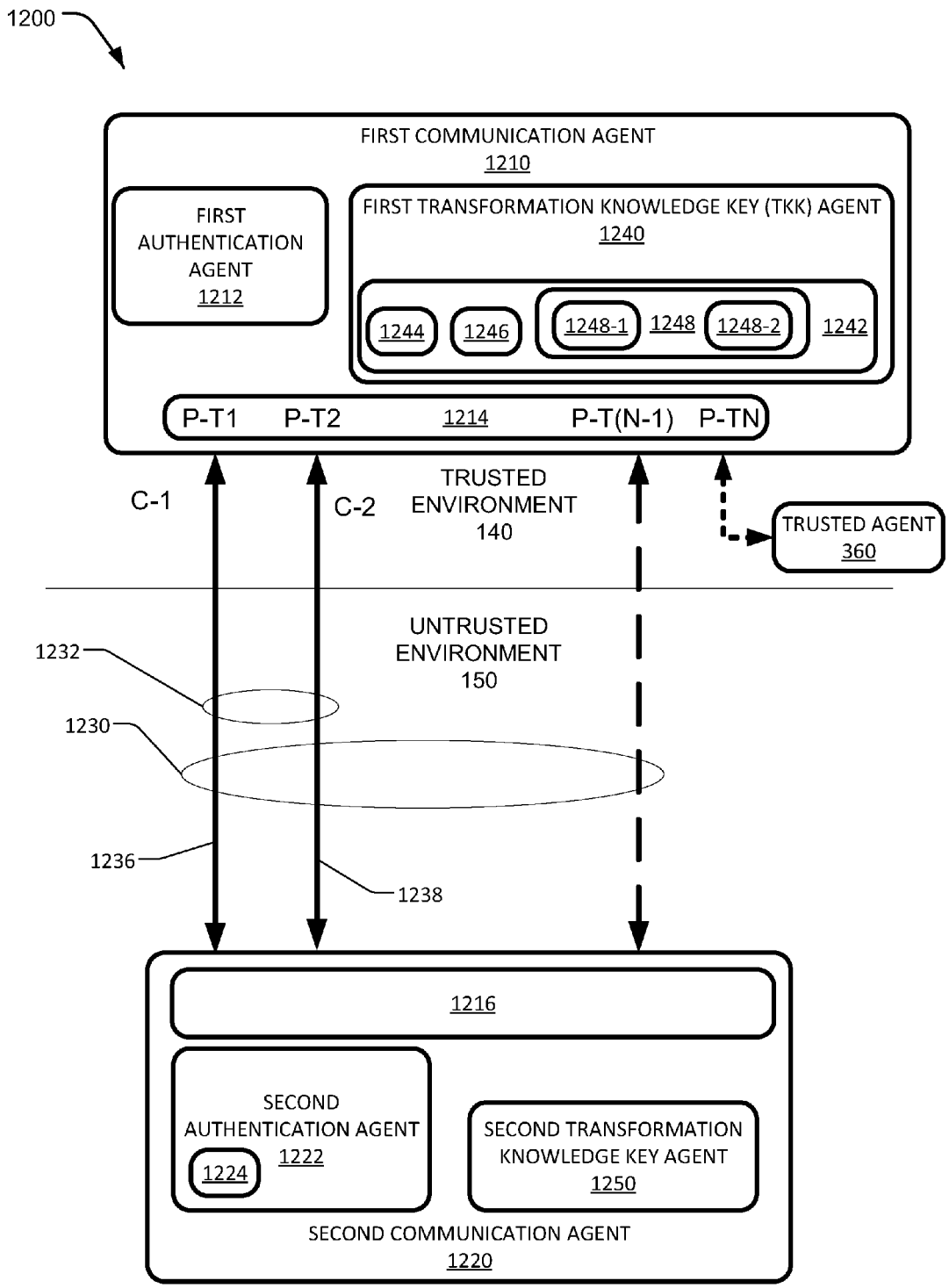
FIG. 12 illustrates a transformation knowledge key (TKK) based system to shield data in transit.

Example of a Transformation Knowledge Key (TKK) Based System to Shield Data in Transit FIG. 12 illustrates an example of a system 1200 to shield data in transit. In an implementation, the system 1200 may include a first communication agent 1210 configured to communicate with a second communication agent 1220 via a plurality of communication paths 1230. In the IT solutions environment, a communication path may be defined as a connecting link, passage or route between two communicating nodes or end points. The system 1200 may also be referred to as a K-COM system.

In an implementation based on the Internet Protocol (IP), a communication path between the two communication agents 1210 and 1220 may be established by connecting available ports and channels associated with a first network interface 1214 and a second network interface 1216 respectively. Although only two communication agents 1210 and 1220 are illustrated in system 1200, it is understood that the system 1200 may include N number of communication agents, N being a finite integer.

In an implementation, the first communication agent 1210 may be substantially similar to the communication agent 440 described with reference to FIG. 4, and a plurality of communication paths 1230 may be substantially similar to one or more of the communication links 384 and 386 described with reference to FIG. 3.

In an implementation, the system 1200 may be implemented using any published communication protocol. It is understood that the system 1200 is not limited to the IP protocol based implementation. For example, the system 1200 may be implemented using non-IP protocols such as AppleTalk, IPX and/or other proprietary communication protocols to enhance communication security between two nodes.

In an implementation, the communications shield agent (T) 1150 is similar to the first communication agent 1210, both residing in a trusted environment 140 and the second communication agent 1220 is similar to the communications shield agent (U) 1152, both residing in an untrusted environment 150. The system 1200 may include other configurations of the first and second communication agents 1210 and 1220. For example, these may include the first and second communication agents 1210 and 1220 residing in the trusted environment 140, or the first and second communication agents 1210 and 1220 residing in the untrusted environment 150, or a configuration in which the first communication agent 1210 may reside in the untrusted environment 150 and the second communication agent 1220 may reside in the trusted environment 140. In an implementation, the system 1200 may be used by two processes running on the same computer for exchanging information securely, e.g., via message pipes.

Although the plurality of communication paths 1230 between the first and second communication agents 1210 and 1220 may be built with well-known secure tunnels, e.g., OpenSSL tunnels, HTTP Secure tunnels, and similar others, the security of the plurality of communication paths 1230 (including upper layers like session, presentation and application layers of communication) may be further enhanced to provide extraordinary levels of increased security by using the 'split-and-spread' technique in which a TKK having KNOS parameters is used to shield data that is being communicated (may be referred to as data in transit) via the plurality of communication paths 1230.

In an implementation, security levels of the plurality of communication paths 1230 may be configured to have different grades based on complexity of the TKK algorithms selected, e.g., 64/128/256/1024-bit encryption key-length of TKK, small/medium/large level of noise insertion, combination or re-ordering and multiple splits of data. Thus, the TKK policy engine 392 may be configured to communicate highly sensitive and smaller sized messages over communication paths providing the highest security.

In an implementation, the first communication agent 1210 includes a first TKK agent 1240 residing in the trusted environment 140 and the second TKK agent 1250 residing in the untrusted environment 150. The first TKK agent 1240 may be configured to receive a plurality of TKK's 1242 from the trusted agent 360 described with reference to FIG. 3. In an implementation, the second TKK agent 1250 may be configured to receive the plurality of TKK's 1242 from the first TKK agent 1240.

The first and second communication agents 1210 and 1220 may be configured to use the plurality of TKK's 1242 to shield the messages in transit. In an implementation, the first TKK agent 1240 is configured to securely communicate with the trusted agent 360 to exchange TKK related information, e.g., communicate with the TKK policy engine 392 described with reference to FIG. 3.

In an implementation, shared memory (not shown) in the trusted environment 140 may be used to share TKK related information between the trusted agent 360 and the first TKK agent 1240. One or more of the plurality of communication paths 1230 may also be used to share TKK related information between the trusted agent 360 and the first TKK agent 1240. In an implementation, the TKK policy engine 392 and the TKK generator 410 described with reference to FIGS. 3 and 4 respectively reside and execute only in the trusted environment 140.

In an implementation, the first TKK agent 1240 receives one or more TKK's 120 from the TKK generator 410. Whereas, the second TKK agent 1250 of the second communication agent 1220 is configured to perform data transformation function, e.g., similar to the data transformer 420 described with reference to FIG. 4, and operates on TKK 120 received via K-COM from the first communication agent 1210.

In an implementation, the first TKK agent 1240 is configured to interact with the TKK generator 410 whereas the second TKK agent 1250 may be configured (e.g., for security reasons) to not have access to the TKK generator 410.

In an implementation, the first communication agent 1210 includes a first authentication agent 1212 and the second communication agent includes a second authentication agent 1222. Each of the first and second authentication agents 1212 and 1222 may be configured to securely establish communication across at least two paths 1232 of the plurality of communication paths 1230.

In an implementation, the plurality of communication paths 1230 may include M communication paths, M being an integer greater than 1. The second authentication agent 1222 may be configured to include a second authentication ID-U 1224.

In an implementation, the first and second communication agents 1210 and 1220 may be configured to perform the following functions:
1) Select the at least two paths 1232 of the plurality of communication paths 1230 to establish enhanced secure communications between them.
2) After establishing first communication path, use an initial TKK-0 1244 included in the plurality of TKK's 1242 to establish further communication paths.
3) After at least two communication paths are established, transfer first TKK 1246 using initial TKK-0 1244 and then using first TKK 1246, shield and split authentication ID-U 1224 message and transfer split message segments across at least two established paths 1232. The initial TKK-0 1244 is described as an active TKK that is used to communicate information about new TKK's (e.g., first TKK 1246) from the pluralities of TKK's 1242. The new TKK's such as the first TKK 1246 may be used to establish additional secure communication paths dynamically. In an implementation, the number of communication paths of the M available paths selected after establishing the at least two communication path may be changed (e.g., increased or decreased) dynamically as configured by the policy engine 292, 392.
4) After verification of the authentication ID-U 1224 using the first TKK 1246 as the active TKK, use additional TKK's 1248 that are also included in the plurality of TKK's 1242 to shield further messages by splitting the messages being communicated between the first and second communication agents 1210 and 1220 via the at least two paths 1232.
5) In an implementation, additional TKK's 1248 may include separate TKK-T 1248-1 for the first communication agent 1210 and TKK-U 1248-2 for the second communication agent 1220.

In an implementation, the authentication ID ID-U 1224 included in the second authentication agent 1222 may include user id, name, password or credentials, privileges, and similar other identifiers.

In an implementation, the at least two paths 1232 may be configured as a first path 1236 (e.g., using channel C-1 on port P-T1) and a second path 1238 (e.g., using channel C-2 on port P-T2). Additional details of a communications protocol implemented by the first and second communication agents 1210 and 1220 to shield data in transit is described with reference to FIGS. 13A and 13B.

In an implementation, the initial TKK-0 1244 is used to shield messages being communicated via the at least two paths 1232 securing one path at a time. The initial TKK-0 1244 may be configured to include a subset of the KNOS parameters or KNOS transformation operator types (e.g., KNO from KNOS) of the shielding algorithms described with reference to FIGS. 5, 9, 10A and 10B.

In an implementation, the initial TKK-0 1244 may be configured to include all KNOS parameters of the shielding algorithms except the split algorithm S. That is, since initially only one communication path is available, the message is not split. Subsequently after establishing more than one path of 1232, the message is split between the at least two paths 1232.

Once enhanced secure communications is established between the first and second authentication agents 1212 and 1222 using the at least two paths 1232 and using an active TKK, then subsequent shielded communication may occur to communicate new TKK's by splitting the messages via the at least two paths 1232 of the plurality of communication paths 1230 using the active TKK. For example, if TKK-3 is currently active then TKK-3 is used to communicate a new TKK such as TKK-4 to establish new communication paths. It is understood that more than the at least two paths 1232 may be used for secure communications.

In an implementation, the split algorithm S parameter (or S transformation operator) may split a message into N segments (N is an integer greater than 1) and each one of the N segments may be communicated via one or more of the M communication paths of the plurality of communication paths 1230.

Example Communications Protocol for Shielding Data in Transit

Figure 13A:
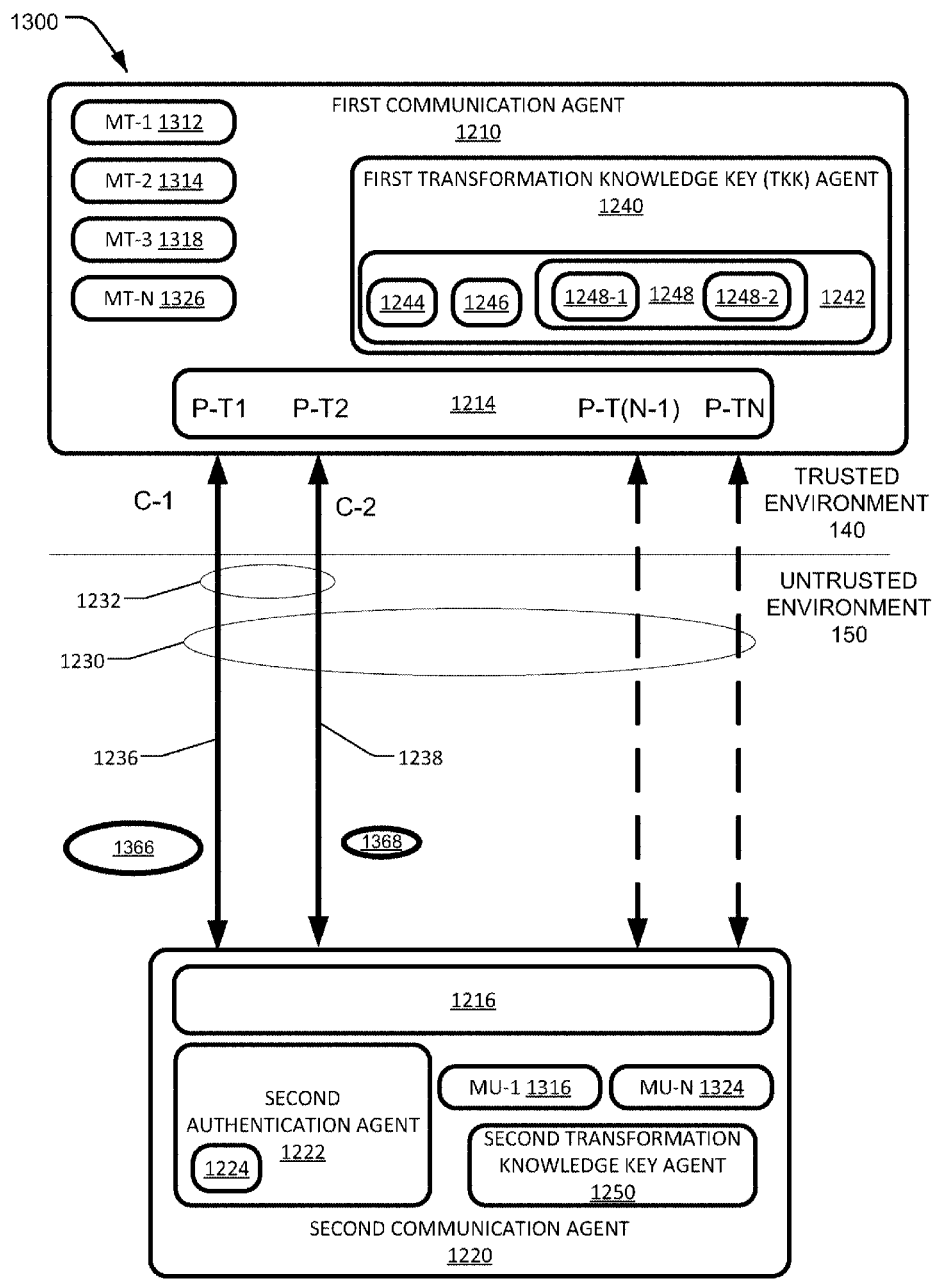
FIG. 13A illustrates a simplified block diagram of a system for secure messaging of data in transit.
Figure 13B:
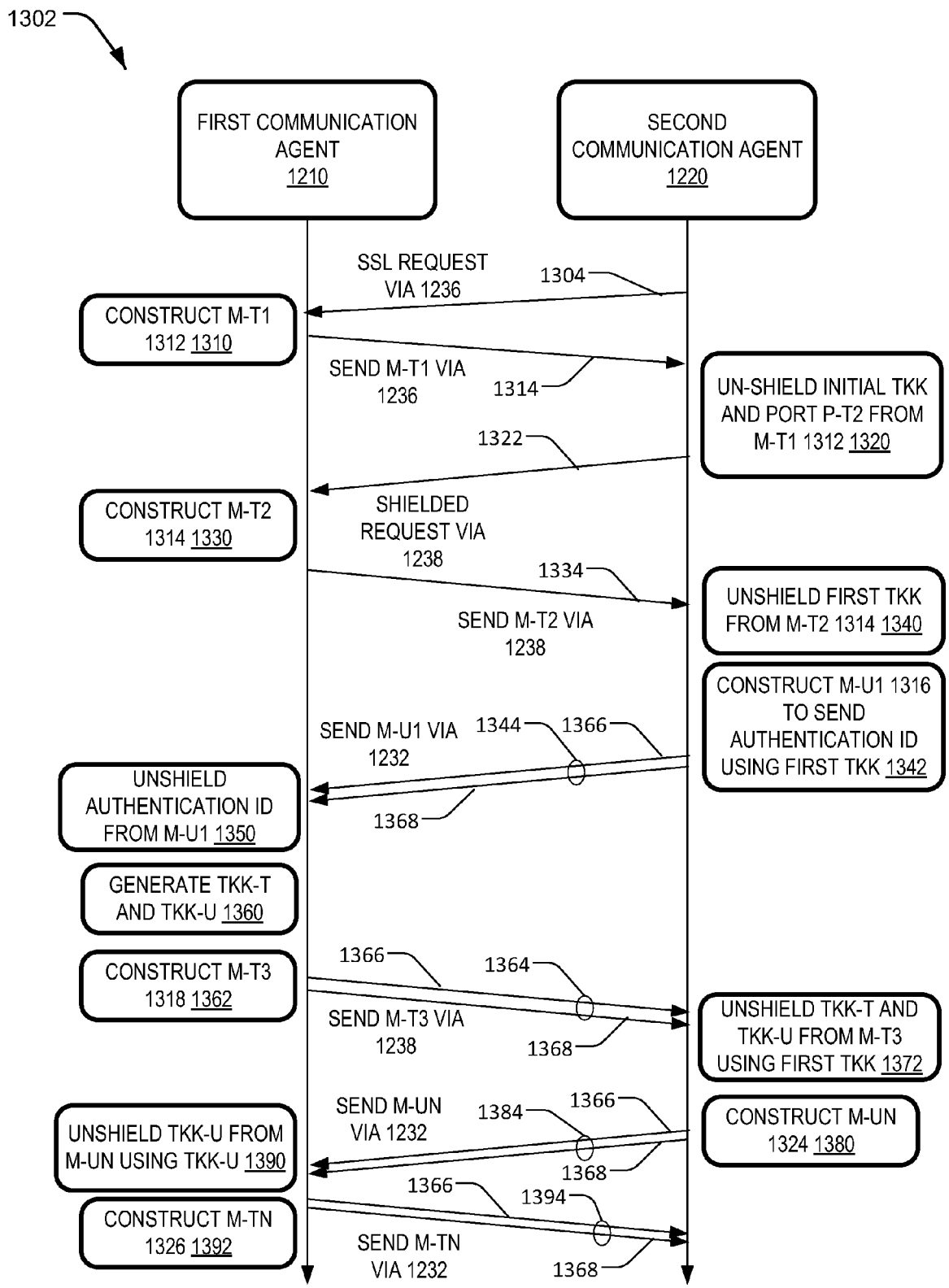
FIG. 13B is a simplified message flow diagram illustrating a process to implement the techniques described herein for shielding data in transit.

FIG. 13A is a simplified block diagram of a system 1300 for secure messaging of data in transit and FIG. 13B is a simplified message flow diagram illustrating a process 1302 to implement the techniques described herein for shielding data in transit.

Referring to FIGS. 12, 13A, and 13B, the process 1302 begins at operation 1304 when a second communication agent 1220 opens a first SSL connection request using the first path 1236 of the at least two paths 1232. In an implementation, the first path 1236 may be pre-configured (e.g., use a default value of a port number and channel number).

At operation 1310, the first communication agent 1210 accepts the SSL communication via the first path 1236, generates and uses the initial TKK-0 1244 to construct a message M-T1 1312 that includes: 1) the initial TKK-0 1244 secured by SSL and 2) a port number P-T2 (configured under policy control and selected from P-N number of ports) that is shielded by the initial TKK-0 1244.

At operation 1314, the first communication agent 1210 sends message M-T1 1312 via the first path 1236 to the second communication agent 1220. If first communication agent 1210 does not get a response to message M-T1 1312 from the second communication agent 1220 via port number P-T2 within a configured time interval, then the first communication agent 1210 terminates the communication session. Since only the first path 1236 is secured via SSL, the initial TKK-0 1244 does not include a split (S) algorithm component of KNOS. In an implementation, the initial TKK-0 1244 may be secured by SSL and optionally shielded (to further enhance security of data in transit) by using a proprietary pre-configured TKK-X (not shown) included in the plurality of TKK's 1242.

At operation 1320, the second communication agent 1220 receives message M-T1 1312 via the first path 1236, decodes the initial TKK-0 1244, and un-shields the port P-T2 data using the initial TKK-0 1244. At operation 1322, the second communication agent 1220 then sends a second connection request to the first communication agent 1210 on port P-T2 and establishes connection over the second path 1238 of the at least two paths 1232.

At operation 1330, the first communication agent 1210 accepts the second connection from the second communication agent 1220 via the second path 1238 and constructs a message M-T2 1314 that includes a first TKK-1 1246 that is shielded by the previous TKK, e.g., the initial TKK-0 1244.

At operation 1334, the first communication agent 1210 communicates message M-T2 1314 to the second communication agent 1220 via the second path 1238. Since the first and second paths 1236 and 1238 (representing the at least two paths 1232) of the plurality of communication paths 1230 are established, the first TKK-1 1246 includes the split algorithm parameter S of KNOS.

Due to the inherent randomness in configuring split ratio (may vary between 0% and 100%) and the split patterns used in the split algorithm parameter of KNOS, the splitting of messages into different segments based on TKK policy control configuration adds an extraordinary level of security to shield data in transit. The extraordinary level of security may be further enhanced by adding additional paths (e.g., other than the first and second paths 1236 and 1238).

At operation 1340, the second communication agent 1220 receives message M-T2 1314 and using the initial TKK-0 1244 it un-shields the message to extract the first TKK-1 1246. At operation 1342, the second communication agent 1220 constructs message M-U1 1316 containing authentication information ID-U 1224 by using the first TKK-1 1246.

At operation 1344, the second communication agent 1220 splits a message (e.g., M-U1 1316) into a first path message segment 1366 (e.g., M-U1-1) and a second path message segment 1368. For example, the second communication agent 1220 sends message M-U1 1316 by splitting it into the first path message segment 1366 (e.g., M-U1-1) and the second path message segment 1368 (e.g., M-U1-2) that are communicated using the at least two paths 1232.

At operation 1350, the first communication agent 1210 receives the first path and second path message segments 1366 and 1368 respectively communicated across the at least two paths 1232, joins the two segments and un-shields the M-U1 1316 message using the first TKK-1 1246 to extract the authentication information ID-U 1224. If ID-U 1224 is invalid, the first communication agent 1210 terminates the communication session.

At operation 1360, the first communication agent 1210 generates additional TKK's 1248 of the plurality of TKK's 1242 for further communications of shielded messages. At operation 1362, the first communication agent 1210 prepares message M-T3 1318 containing TKK-T 1248-1 and TKK-U 1248-2 using the first TKK-1 1246 as a shield. At operation 1364, the M-T3 1318 message that is split into a first path message segment 1366 is sent across the first path 1236 (e.g., message M-T3-1) and a second path message segment 1368 sent across the second path 1238 (e.g., message M-T3-2) in accordance with the splitting algorithm parameter S of KNOS.

At operation 1372, the second communication agent 1220 receives the M-T3 1318 message split across the first path 1236 (message M-T3-1) and the second path 1238 (message M-T3-2), combines the two segments to reconstruct M-T3 1318, and extracts TKK-U 1248-2 and TKK-T 1248-1 using the first TKK-1 1246.

At operation 1380, the second communication agent 1220 constructs a message M-UN 1324 (which may be any protocol specific message) using TKK-U 1248-2 to send shielded information to the first communication agent 1210.

At operation 1384, the second communication agent 1220 sends the message M-UN 1324 to the first communication agent 1210. The message M-UN 1324 is split between the at least two paths 1232. TKK-U 1248-2 is one of the additional TKK's 1248 included in the plurality of TKK's 1242.

At operation 1390, the first communication agent 1210 un-shields the message M-UN 1324 using TKK-U 1248-2. At operation 1392, the first communication agent 1210 constructs a message M-TN 1326 using TKK-T 1248-1.

At operation 1394, the first communication agent 1210 sends the message M-TN 1326 to the second communication agent 1220. The message M-TN 1326 is split between the at least two paths 1232 of the plurality of communication paths 1230. TKK-T 1248-1 is one of the additional TKK's 1248 included in the plurality of TKK's 1242.

Subsequent shielded communications between the first and second communication agents 1210 and 1220 may use TKK-T 1248-1 and TKK-U 1248-2 respectively or the first communication agent 1210 may use different TKK's as configured per TKK policy control configured by the policy engine agent 392.

In an implementation, TKK policy control may specify use of a different TKK for each instance of data in transit, e.g., from one sender to a receiver. Although, the splitting of message into the first path and second path message segments 1366 and 1368 is illustrated across 2 communication paths 1236 and 1238 respectively, it is understood that the splitting may occur across N communication paths, N being a positive integer.

In an implementation, it is understood that the order in which the process 1302 or method described herein is illustrative and not intended to be construed as a limitation, and any number of the described process blocks can be combined in any order to implement the process, method or alternate method. Additionally, individual blocks may be deleted from the process without departing from the spirit and scope of the subject matter described herein. Furthermore, the process may be implemented in any suitable hardware, software, firmware, or a combination thereof, without departing from the scope of the invention.

Figure 14:
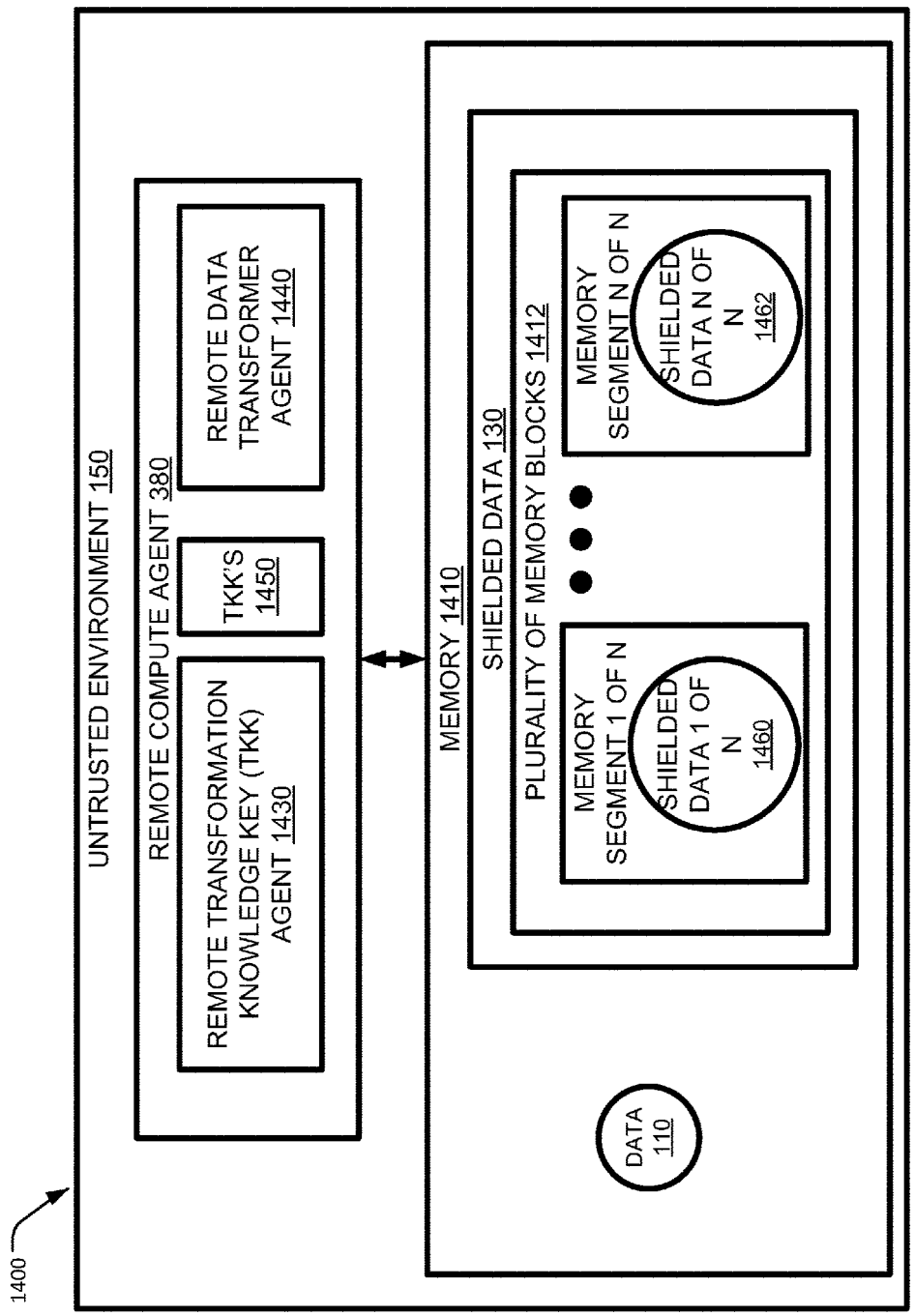
FIG. 14 is a transformation knowledge key (TKK) based system to shield data stored in volatile memory.

Example of a Computer System to Implement Shielding of Data Stored in Volatile Memory FIG. 14 is a block diagram of a system 1400 that is configured to operate in the untrusted environment 150 to shield data no stored in the memory 1170. In an implementation, the data no may be transient, short term or transaction oriented data that may be typically stored in random access memory (RAM) or a volatile memory device. That is, contents of the memory 1170 may be lost if the memory 1170 is not refreshed within an allowable period of time. The memory 1170 may be configured to include a plurality of memory blocks 1412. In an implementation, the system 1400 may also be referred to as a K-MEM system and the memory blocks may also be referred to as memory pages.

In an implementation, the system 1400 is configured to operate in the untrusted environment 150 to shield the data 110. The system 1400 may be configured to include: 1) the remote compute agent 380 (described with reference to FIGS. 3 and 12) configured to transform the data 110 into the shielded data 130, and 2) the memory 1170 coupled to the remote compute agent 380, the memory 1170 being configured to store the shielded data 130 in the plurality of memory blocks 1412.

In an implementation, the remote compute agent 380 is configured to include: a remote transformation knowledge key (TKK) agent 1430 and a remote data transformer agent 1440. The remote TKK agent 1430 is configured to provide a plurality of TKK's 1450 used for transforming the data no into the shielded data 130 and the remote data transformer agent 1440 is configured to transform the data 110 into N segments of the shielded data 1460, 1462 using a corresponding instance of the plurality of TKK's 1450, the N segments of the shielded data 1460, 1462 being stored in corresponding N blocks of the plurality of memory blocks 1412, N being a positive integer.

When an application (e.g., a web hosting application) (not shown) is executed by the system 1400, the data 110 may be stored in the memory 1170 for certain period of time depending on the application. The data 110 or a portion thereof may be stored in the memory 1170 during an entire run-time of the application. The data no associated with an application may also be referred to as K-Data. During execution of the application, an Operating System (OS) for the system 1400 may be configured to swap the data 110 stored in one or more memory pages or blocks of the plurality of memory blocks 1412 with data stored on a hard disc (not shown). Also, if an application fails to execute normally, e.g., the application execution encounters an unexpected error, an entire memory dump of the plurality of memory blocks 1412 may be saved on a hard disc (e.g., data storage devices 370) for diagnostic purpose. If the application is running in the untrusted environment 150 and if the data no stored in the plurality of memory blocks 1412 includes sensitive information (like password, credit card number, and similar other), then occurrences of memory dump events to a hard drive may raise security concerns. K-MEM shielding technique described herein shields the data 110 in the memory 1170 in the untrusted environment 150 under full control of the trusted agent 360 and transforms it to the shielded data 130.

In an implementation, the TKK policy engine 392 (described with reference to FIG. 3) and the TKK generator 410 (described with reference to FIG. 4) reside and execute only in the trusted environment 140. In an implementation, the remote TKK agent 1430 receives one or more TKK's 1450 from the TKK generator 410 via a secure communications link (e.g., via the plurality of communication paths 1230). The remote data transformer agent 1440 is configured to perform data transformation function only (e.g., same as the functions performed by the data transformer 420) and operates on the data 110 using TKK's 1450 received via K-COM system's 1200, 1300 described with reference to FIGS. 12, 13A and 13B.

In an implementation. TKK's 1450 used to shield the data 110 are generated by the trusted agent 360 under policy control or under rules or logic associated with the policy engine agent 392, and policies (rules) that may be used to un-shield the data 110 using the transformation knowledge key 120. The policy engine agent 392 may be configured to generate application specific TKK's, such as: a) Random TKK's per instance of data, b) adjustable TKK-level as per sensitivity of data, c) Set of TKK's as per data-types, and d) dynamic change of TKK's for already shielded data.

In an implementation, the system 1400 or the K-MEM system may be configured to provide shield for basic data types such as: character, string, integer, double integer, and others. Also the structured or unstructured data can be shielded. In an implementation, a library of classes say K-data-library can be used to shield basic data-types such as Kchar, Kstring, Kint, Kdouble and others. Then in a program, objects of appropriate K-data types can be declared. Furthermore, objects of any structure or class can be shielded by declaring its individual members having basic data-types as K-data-types. For example, class UserInfo can be declared as:

```
class UserInfo {
    Kstring       name;
    Kstring       creditCardNumber;
    Kstring       password;
    Kdouble       balanceAmount;
};
```

Information stored in any object of this class declared in memory 1170 may be shielded. Thus, by shielding primary data types (e.g., integer and string), derived data structures (e.g., structures/classes) may also get shielded in memory. By having methods operating at byte level on shielded data, appearance of full plaintext in memory may be reduced or even eliminated.

In an implementation, the system 1400 (or K-MEM system) may be configured to provide methods to operate on the data 110 or the shielded data 130 including:

1) Set (plaintext)—This function provides shield to the plain-text. It may be called as soon as plain-text is loaded in memory 1170 and then plain-text data may be deleted immediately.

2) Get (plaintext)—Get full plaintext out of previously shielded data. This may be used only if required. Preferred methods are: Use other methods which operate directly on k-data. Extract one plain-byte one at a time at given index, operate on it, and then discard it.

3) GetByteAt (index)—Get one plain byte at a given index.
4) Compare (k-data)—Compares with other k-data. This does not require either of data to un-shield. Internally it extracts one byte each from operand and operator k-data using GetByAt(index) method, compares it and destroys it.
5) Add (k-data)—Adds given k-data to operand k-data. In case of numeric data, it does mathematical addition and in case of string, it appends other k-data.
6) Other mathematical and logical operations may be performed such as Subtract, Divide, etc., on numeric k-data and standard string operations on k-string data-type.
7) ReShield (TKK)—Re-shields by another TKK. This method may not keep data in memory 1170 static for a long or persistent period of time. In regards to the K-MEM methods described above, operations may be unary or binary and may be extended iteratively on multiple k-data and TKK of operand k-data and operator k-data may be different.

In an implementation, the system 1400 or K-MEM system may be configured to provide the following functions:
a) Shielding plain text data stored in volatile memory—Plain text data is stored in shielded form in the memory 1170 and so, when memory dump occurs in the untrusted environment 150 it is not visible as plain text data. For example, the password "abcde" shielded by K-MEM system may be stored as "PQRST" in a scattered manner in the plurality of memory blocks 1412. Thus, decoding shielded data from a memory dump is virtually impossible without intimate knowledge about the TKK structure and its operation. In addition, even if TKK structure and its operation may be known, the decoding shielded data from the memory dump may still be not possible since TKK structure is dynamically changing under the control of the policy engine 292 or 392.
b) 'Spilt-and-Spread' technique—Shielded data 130 may be 'split and spread' in different memory blocks (e.g., the N segments of the shielded data 1460, 1462) so that it will not appear continuous in memory. For example, shielded password "PQRST" can be split into two different memory blocks say "xxxPxxxRxxx" in memory segment 1460 and "xxQxxxxTxxSx" in memory segment 1462.
c) K-MEM system supports methods to operate directly on the shielded data 130. So it may not be required to re-convert shielded data 130 to plain text. Internally, K-MEM system operates at byte-level, so at any point in time only one byte of plain text data may be extracted, operated upon and then discarded (overwritten).
d) If already shielded data enters into the untrusted environment 150 externally (e.g., though K-COM or through K-STORE), then by using K-MEM methods which operate directly on the shielded data 130, it may not be required to un-shield data to plain-text. In such cases, plain text data may not appear in the untrusted environment 150 memory in plain text form. For example, if user-entered password comes in to the untrusted environment 150 in shielded form through K-COM and the actual password to check against comes to the untrusted environment 150 through another channel (say through different K-COM connected to trusted environment 140 or K-STORE), then both may be compared by K-MEM methods without un-shielding either password to plain text.
e) K-MEM allows shielding of basic data types, such as string, integer, float and so on. So any objects of structured data may also be shielded by selectively shielding basic data types that comprise given structure.
f) K-MEM may also shield any binary objects without knowing the schema of the object. This technique enables memory pages to be swapped and memory dumps taken in the untrusted environment 150 may be shielded at the OS level under the policy control of the trusted environment 140.

TKK's 1250 of K-MEM are generated inside the trusted environment 140 under policy control and may not be stored permanently in the untrusted environment 150. When an application is executed in the untrusted environment 150, the trusted environment 140 may provide fresh application specific TKK's 1250 to the untrusted environment 150 for shielding K-MEM objects in the untrusted environment 150 for that particular session. Thus, for each new instance of an application, a different TKK is generated.

Figure 15:
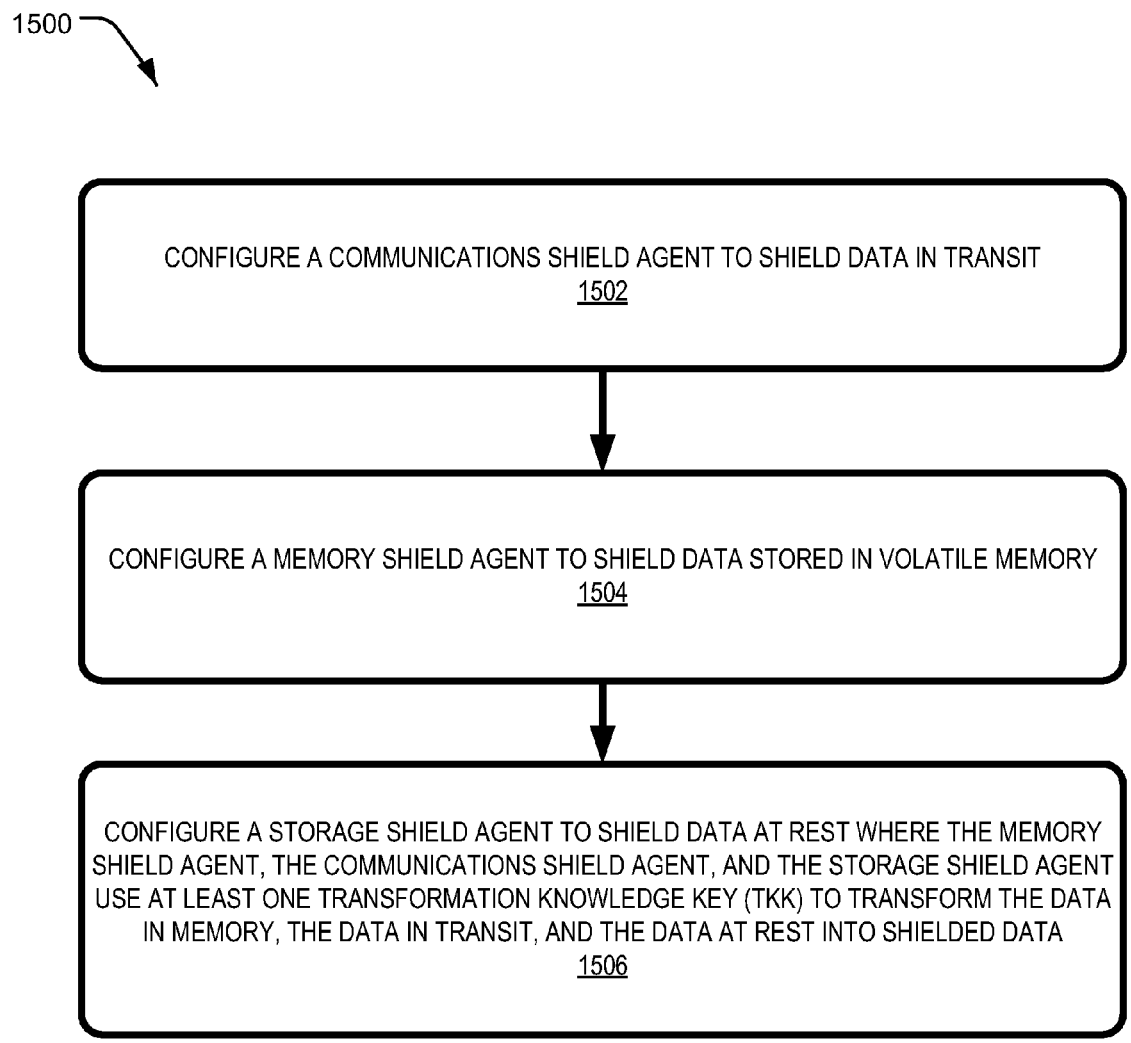
FIG. 15 is a simplified flow diagram illustrating a process to implement the techniques described herein for shielding data in memory, data in transit, and data at rest.

Example Process for Shielding Data in Memory, Data in Transit, and Data in Storage FIG. 15 is a flow diagram illustrating a process 1500 to implement the techniques described herein for shielding data. The process 1500 may be implemented, at least in part, by the systems 100, 200, 300, 400, 500, 600, 700, 800, 900, 1000, 1200, 1300 and 1400 as described with reference to FIGS. 1-14 and as described herein.

Referring back to FIG. 15, the process 1500 begins at operation 1502, where a communications shield agent is configured to shield data in transit. At operation 1504, a memory shield agent is configured to shield data stored in volatile memory. At operation 1506, a storage shield is configured to shield data at rest stored in a hard disk drive. The communications shield agent, the memory shield agent, and the storage shield agent use at least one transformation knowledge key (TKK) to transform the data in memory, the data in transit, and the data at rest into shielded data.

In an implementation, a remote agent connects to trusted agent by K-COM, then TKKs for K-MEM and K-STORE are generated by the trusted agent under policy control and provided to untrusted agent through K-COM. The order in which any process or method described herein is not intended to be construed as a limitation, and any number of the described process blocks can be combined in any order to implement the process, method or alternate method. Additionally, individual blocks may be deleted from the process without departing from the spirit and scope of the subject matter described herein. Furthermore, the process may be implemented in any suitable hardware, software, firmware, or a combination thereof, without departing from the scope of the invention. For example, the process 1100 may be optimized further. The application server may be configured to invoke the remote agent directly with the data handle and look for the data requested (e.g., policy record). The remote agent may then consult with the trusted zone agent, using the data handle, and the two together in co-operation may present the data record to the application server.

Example of a Computer System to Implement Shielding of Data in Transit

Figure 16:
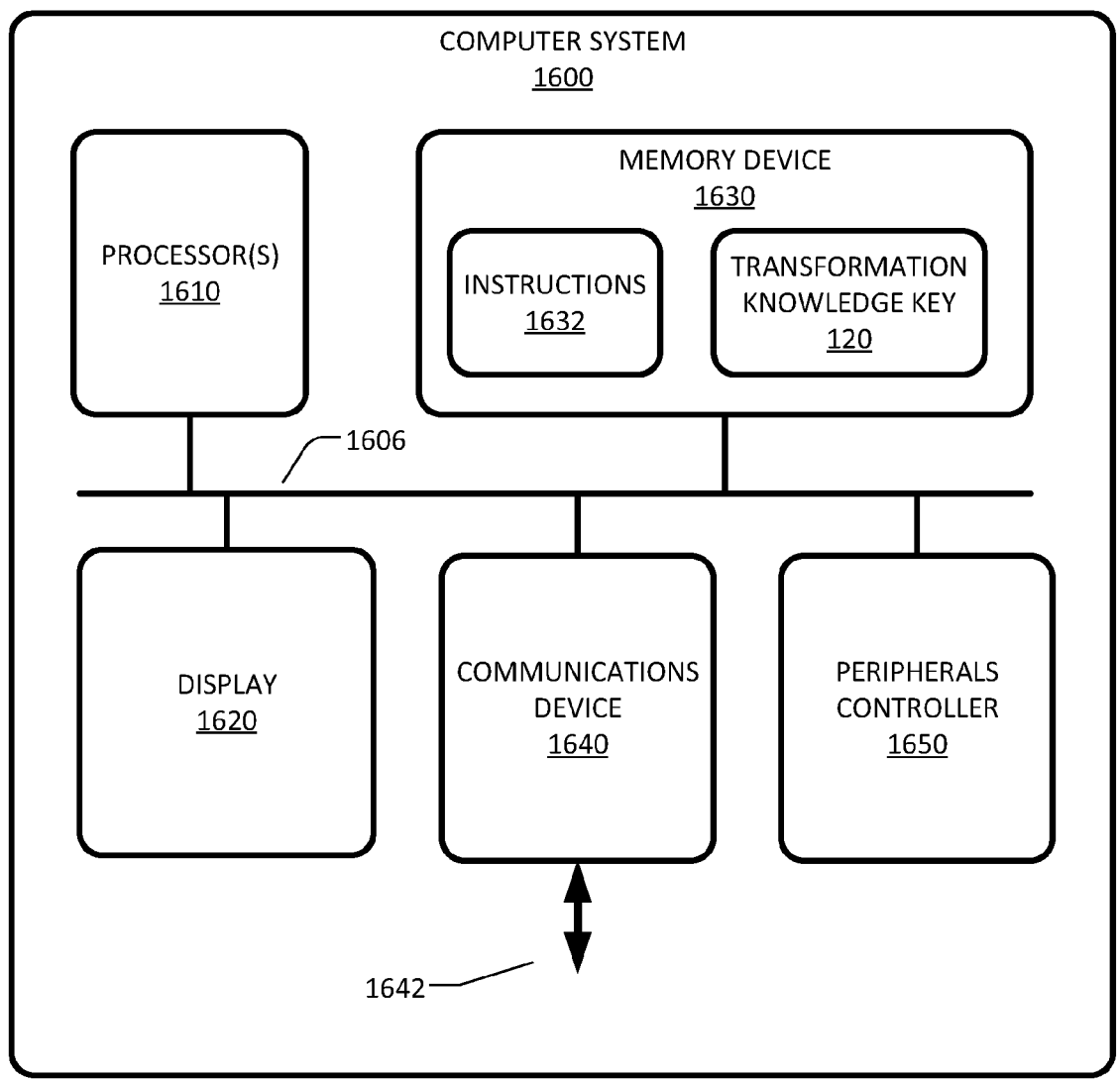
FIG. 16 is a block diagram of a computer system that is configured to shield data.

FIG. 16 is a block diagram of a computer system 1600 that is configured to shield data. More particularly, users may have a desire to shield data in unsecure environments to reduce costs and improve scalability. Examples of such computer systems that may be used to shield data may include, but are not limited to, servers, client devices, workstations, desktop devices, a tablet computer, a netbook, a notebook computer, a laptop computer, mobile phone, a cellular phone, a smartphone, a personal digital assistant, a multimedia playback device, a digital music player, a digital video player, a navigational device, a digital camera, a set top device, and the like. Any of these computer systems may be virtualized or may be bare-metal.

In an implementation, the computer system 1600, includes a processor 1610 coupled to a bus 1606, a memory device 1630 coupled to the processor via the bus 1606, a communications device 1640 coupled to the processor 1610 via the bus 1606, and a peripherals controller 1650 coupled to the processor 1610 via the bus 1606. The communications device 1640 is configured to communicate with other computer systems (not shown) via a communications agent 1642.

A user interaction device may include a display 1620. The peripherals controller 1650 may be used to control peripherals such as a touch screen, a mouse, a trackball, or similar other cursor positioning devices, a hard disk storage device, and others. The display 1620 is configured to provide a graphical user interface for user interaction.

It should be understood that depending on the computing load, more than one processor 1610 may be included in the computer system 1600. The memory device 1630 is operable to store instructions or commands 1632 that are executable by the processor 1610 to perform one or more functions. It should also be understood that the term "computer system" is intended to encompass any device having a processor that is capable of executing program instructions from a memory medium. Various solutions, applications, functions, processes, method(s), programs, agents, and operations described herein may be implemented using the computer system 1600. Any system such as system 100, 200, 300, 400, 500, 600, 700, 800, 900, 1000, 1100, 1200, 1300, and 1400 or any processes or methods such as process 1302 and 1502 as described herein may be implemented using the computer system 1600. For example, the processor 1610 is operable to execute the instructions 1632 stored in memory device 1630 for generating the transformation knowledge key 120.

The components of the computer system 1600 may be modules of computer-executable instructions, which are instructions executable on a computer, mobile device, or the processors of such devices. While shown here as agents, the components may be embodied as hardware, firmware, software, or any combination thereof. The techniques described herein may be performed, as a whole or in part, by hardware, software, firmware, or some combination thereof.

In various implementations the program instructions 1632 may be implemented in various ways, including procedure-based techniques, component-based techniques, object-oriented techniques, rule-based techniques, among others. The program instructions 1632 can be stored on the memory 1630 or any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The term "techniques," for instance, may refer to one or more devices, apparatuses, systems, methods, articles of manufacture, and/or computer-readable instructions as indicated by the context described herein. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form. Unless the context indicates otherwise, the term "logic" used herein includes hardware, software, firmware, circuitry, logic circuitry, integrated circuitry, other electronic components and/or a combination thereof that is suitable to perform the functions described for that logic.

Systems and methods described herein may include one or more IT solutions for shielding data that may be implemented in one or more trusted environments and/or in one or more untrusted environments. In some implementations, a single instance of the trusted and/or the remote agent may serve multiple IT solutions concurrently (referred to as a "federated" approach), thereby enabling one IT solution to talk to another IT solution. In some implementations, the trusted agent may be spread across single or multiple locations such that all the instances may operate in co-operation with each other. They may replicate each other's databases, assist in speeding up the processes of shielding and un-shielding. They may act as backup agents to each other in order to provide high-availability & lower latency to the solution as a whole. Replicated trusted agent databases may be used in extraordinary circumstances, e.g., for data recovery in a disaster situation.

Systems and methods described herein provide extraordinary levels of data shielding to data in memory, data in transit and data at rest that enables users to take advantage of significantly lower cost and improved scalability offered by Cloud based services without compromising on the integrity and confidentiality of the data stored in untrusted environments. Extraordinary results are derived from use of the following features that significantly improve data shielding and lower costs: (1) the order of performing data transformations may be determined in real-time. This makes it virtually impossible to reconstruct shielded data since the system is always dynamically altering the process to reconstruct the data, (2) algorithms are user-specified and encoded. This gives complete control to a user to protect proprietary data, (3) levels and types of algorithms used for data transformations are under the control of a user, (4) user maintains full control of distribution of the results of the transformations across multiple trusted and untrusted locations, (5) the transformation knowledge keys themselves may be shielded, (6) lack of a single segment of shielded data (which may be stored in a secured environment) will make extraordinarily difficult, if not practically impossible, to reconstruct the original data.

The following examples pertain to further embodiments. A method and system may include a first communication agent configured to communicate the messages via a plurality of communication paths, the first communication agent configured to include: a first authentication agent configured to securely establish at least two paths of the plurality of communication paths; and a first transformation knowledge key (TKK) agent, the first TKK agent configured to use a plurality of TKK's used for shielding the messages, an initial TKK included in the plurality of TKK's being used to securely establish the at least two paths of the plurality of communication paths and additional TKK's of the plurality of TKK's being used to split the messages between the at least two paths of the plurality of communication paths.

In certain implementations, the system may include a second communication agent coupled to the first communication agent via the plurality of communication paths, the second communication agent configured to include: a second authentication agent, the second authentication agent being configured to send an authentication message to the first communication agent using the initial TKK, the authentication message being validated by the first communication agent to securely establish the at least two paths of the plurality of communication paths.

In certain implementations, the system may include a trusted agent configured to operate in a trusted environment, wherein the trusted agent includes: a TKK generator operable to generate the plurality of TKK's; a policy engine configured to control the TKK generator; and the first communication agent configured to operate in the trusted environment, the trusted agent being configured to securely provide the plurality of TKK's to the first communication agent.

In certain implementations, the first transformation knowledge key (TKK) agent is configured to receive the plurality of TKK's from the TKK generator.

In certain implementations, each one of the plurality of communication paths has a configurable security level, the security level being controlled by the policy engine.

In certain implementations, the initial TKK is configured to include KNO parameters of shielding algorithms included in a library of shielding algorithms, wherein the additional TKK's of the plurality of TKK's are configured to include KNOS parameters of the shielding algorithms included in the library of shielding algorithms.

In certain implementations, each one of the messages includes N segments, wherein each one of the N segments is configured to communicate via M communication paths of the plurality of communication paths, wherein M and N are integers greater than 1.

In certain implementations, the second communication agent is configured to operate in an untrusted environment.

In certain implementations, the second communication agent is configured to include a second TKK agent, wherein the second TKK agent is configured to receive the plurality of TKK's from the first TKK agent, the plurality of TKK's being communicated via the at least two paths of the plurality of communication paths.

In certain implementations, the messages exchanged between the first communication agent and the second communication agent are split between the plurality of communication paths in accordance with a splitting (S) algorithm parameter used to shield each one of the messages.

In certain implementations, the first and second communication agents are configured to use the plurality of TKK's to shield the messages in transit.

In certain implementations, the first and second communication agents are configured to reside in the untrusted environment.

In certain implementations, the second communications agent is operable to store the plurality of TKK's in volatile memory coupled to the second communications agent, the plurality of TKK's stored in the memory being erased under control of a policy engine.

In certain implementations, the first and second communications agents are configured to communicate via any two peer-to-peer layers of an ISO 7-layer communication stack.

In certain implementations, the first and second communications agents are configured to communicate via a published communication protocol.

In certain implementations, the first and second communications agents are configured to communicate the messages, wherein the messages are constructed to include data having a variable length.

In certain implementations, the first and second communications agents are configured to communicate the messages, wherein the messages are constructed to include data having a fixed length.

In certain implementations, the initial TKK is an active TKK, the active TKK being used to communicate the additional TKK's in a secure manner.

In certain implementations, a system comprises: a memory shield agent to shield data in memory; a communications shield agent to shield data in transit; and a storage shield agent to shield data at rest, wherein the memory shield agent, the communications shield agent, and the storage shield agent use at least one transformation knowledge key (TKK) to transform the data in memory, the data in transit, and the data at rest into shielded data.

In certain implementations, the memory shield agent, the communications shield agent, and the storage shield agent are configured to operate in an untrusted environment.

In certain implementations, the at least one TKK used by the memory shield agent, the communications shield agent, and the storage shield agent is configured under control of a policy engine.

In certain implementations, a method for shielding data includes configuring a memory shield agent to shield data stored in volatile memory; configuring a communications shield agent to shield data in transit; and configuring a storage shield to shield data at rest stored in a hard disk drive, wherein the memory shield agent, the communications shield agent, and the storage shield agent use at least one transformation knowledge key (TKK) to transform the data in memory, the data in transit, and the data at rest into shielded data.

In certain implementations, the memory shield agent, the communications shield agent, and the storage shield agent are configured to operate in an untrusted environment.

In certain implementations, the at least one TKK used by the memory shield agent, the communications shield agent, and the storage shield agent is configured under control of a policy engine.

In certain implementations, a system configured to operate in an untrusted environment to shield data includes: a remote compute agent configured to transform the data to shielded data; and a memory coupled to the remote compute agent, the memory being configured to store the shielded data in a plurality of memory blocks; wherein the remote compute agent is configured to include: a remote transformation knowledge key (TKK) agent, the remote TKK agent configured to receive a plurality of TKK's for transforming the data into the shielded data; a remote data transformer agent configured to transform the data into N segments of the shielded data using a corresponding instance of the plurality of TKK's, the N segments of the shielded data being stored in corresponding N blocks of the plurality of memory blocks, N being a positive integer.

In certain implementations, the system further includes the remote data transformer agent configured to un-shield the shielded data using the corresponding instance of the plurality of TKK's.

In certain implementations, a value of the N is determined by a data splitting algorithm included in one TKK of the plurality of TKK's used for the shielding.

In certain implementations, the system further includes a trusted agent configured to operate in a trusted environment, the remote TKK agent being configured to receive the plurality of TKK's from the trusted agent.

In certain implementations, the trusted agent is configured to generate the plurality of TKK's under policy control in the trusted environment.

In certain implementations, the policy control is configured to include an algorithm to generate the plurality of TKK's in a random manner per instance of the data.

In certain implementations, types of the data to be shielded includes character, string, integer, double integer, real, boolean, structured and unstructured.

In certain implementations, the remote compute agent is configured to bypass the remote TKK agent in response to receiving an instance of shielded data.

In certain implementations, the plurality of TKK's correspond to an application, wherein different ones of the plurality of TKK's are generated in response to a new instance of the application.

In certain implementations, the memory is a volatile memory device, wherein contents of the memory are lost in response the memory not being refreshed within an allowable period of time.

What is claimed is:

1. A system operable to shield messages, the system comprising:
    a hardware processor;
    logic instructions stored on computer readable storage media and executable by the hardware processor, the logic instructions being configured to include:
        a first communication agent configured to communicate the messages via a plurality of communication paths, the first communication agent configured to include:
        a first authentication agent configured to securely establish at least two paths of the plurality of communication paths; and
        a first transformation knowledge key (TKK) agent, the first TKK agent configured to use a plurality of TKK's used for shielding the messages, an initial TKK included in the plurality of TKK's being used to securely establish the at least two paths of the plurality of communication paths and additional TKK's of the plurality of TKK's being used to split the messages between the at least two paths of the plurality of communication paths, wherein each TKK of the plurality of TKK's is configured to include transformation expressions, wherein the transformation expressions are configured to include transformation operators, the TKK being configurable to include a nested instance of another TKK of the plurality of TKK's, wherein the first communication agent is configured to communicate a message that includes a first TKK of the plurality of TKK's, the message being shielded by the initial TKK, wherein the initial TKK is configured to include KNO transformation operators and parameters of shielding algorithms included in a library of shielding algorithms, wherein the additional TKK's of the plurality of TKK's are configured to include KNOS transformation operators and parameters of the shielding algorithms included in the library of shielding algorithms, wherein K represents an encryption operator, N represents a noise operator, O represents an order operator and S represents a split operator.

2. The system as recited in claim 1 further comprising:
    a second communication agent coupled to the first communication agent via the plurality of communication paths, the second communication agent configured to include:
    a second authentication agent, the second authentication agent being configured to send an authentication message to the first communication agent using the initial TKK, the authentication message being validated by the first communication agent to securely establish the at least two paths of the plurality of communication paths.

3. The system as recited in claim 1, further comprising:
    a trusted agent configured to operate in a trusted environment, wherein the trusted agent includes:
    a TKK generator operable to generate the plurality of TKK's;
    a policy engine configured to control the TKK generator; and
    the first communication agent configured to operate in the trusted environment, the trusted agent being configured to securely provide the plurality of TKK's to the first communication agent.

4. The system as recited in claim 3, wherein the first transformation knowledge key (TKK) agent is configured to receive the plurality of TKK's from the TKK generator.

5. The system as recited in claim 4, wherein each one of the plurality of communication paths has a configurable security level, the security level being controlled by the policy engine.

6. The system as recited in claim 1, wherein each one of the messages includes L segments, wherein each one of the L segments is configured to communicate via M communication paths of the plurality of communication paths, wherein M and L are integers greater than 1.

7. The system as recited in claim 2, wherein the second communication agent is configured to operate in an untrusted environment.

8. The system as recited in claim 2, wherein the second communication agent is configured to include a second TKK agent, wherein the second TKK agent is configured to receive the plurality of TKK's from the first TKK agent, the plurality of TKK's being communicated via the at least two paths of the plurality of communication paths.

9. The system as recited in claim 2, wherein the messages exchanged between the first communication agent and the second communication agent are split between the plurality of communication paths in accordance with a splitting (S) algorithm parameter used to shield each one of the messages.

10. The system as recited in claim 2, wherein the first and second communication agents are configured to use the plurality of TKK's to shield the messages in transit.

11. The system as recited in claim 2, wherein the first and second communication agents are configured to reside in the untrusted environment.

12. The system as recited in claim 2, wherein the second communications agent is operable to store the plurality of TKK's in volatile memory coupled to the second communications agent, the plurality of TKK's stored in the memory being erased under control of a policy engine.

13. The system as recited in claim 12, wherein the policy engine is configured to dynamically change a number of communication paths selected from the plurality of communication paths.

14. The system as recited in claim 2, wherein the first and second communications agents are configured to communicate via any two peer-to-peer layers of a communication stack.

15. The system as recited in claim 2, wherein the first and second communications agents are configured to communicate via a published communication protocol.

16. The system as recited in claim 2, wherein the first and second communications agents are configured to communicate the messages, wherein the messages are constructed to include data having a variable length.

17. The system as recited in claim 2, wherein the first and second communications agents are configured to communicate the messages, wherein the messages are constructed to include data having a fixed length.

18. The system as recited in claim 1, wherein the initial TKK is an active TKK, the active TKK being used to communicate the additional TKK's in a secure manner.

19. A system configured to operate in an untrusted environment to shield data in memory, the system comprising:
 a hardware processor;
 logic instructions stored in the memory and executable by the hardware processor, the logic instructions being configured to include:
 a remote compute agent configured to transform the data to shielded data; and
 the memory coupled to the remote compute agent, the memory being configured to store the shielded data in a plurality of memory blocks;
 wherein the remote compute agent is configured to include:
 a remote transformation knowledge key (TKK) agent, the remote TKK agent configured to receive a plurality of TKK's for transforming the data into the shielded data;
 a remote data transformer agent configured to transform the data into M segments of the shielded data using a corresponding instance of the plurality of TKK's, the M segments of the shielded data being stored in corresponding M blocks of the plurality of memory blocks, M being a positive integer, wherein each TKK of the plurality of TKK's is configured to include transformation expressions, wherein the transformation expressions are configured to include transformation operators, the TKK being configurable to include a nested instance of another TKK of the plurality of TKK's, wherein appearance of the data in memory in plaintext form is eliminated in the untrusted environment, wherein an initial TKK is configured to include KNO transformation operators and parameters of shielding algorithms included in a library of shielding algorithms, wherein additional TKK's of the plurality of TKK's are configured to include KNOS transformation operators and parameters of the shielding algorithms included in the library of shielding algorithms, wherein K represents an encryption operator, N represents a noise operator, O represents an order operator and S represents a split operator.

20. The system as recited in claim 19, further comprising:
 the remote data transformer agent configured to un-shield the shielded data using the corresponding instance of the plurality of TKK's.

21. The system as recited in claim 19, wherein a value of the M is determined by a data splitting algorithm included in one TKK of the plurality of TKK's used for the shielding.

22. The system as recited in claim 19, further comprising:
 a trusted agent configured to operate in a trusted environment, the remote TKK agent being configured to receive the plurality of TKK's from the trusted agent.

23. The system as recited in claim 22, wherein the trusted agent is configured to generate the plurality of TKK's under policy control in the trusted environment.

24. The system as recited in claim 23, wherein the policy control is configured to include an algorithm to generate the plurality of TKK's in a random manner per instance of the data.

25. The system as recited in claim 19, wherein types of the data to be shielded includes character, string, integer, double integer, real, boolean, structured and unstructured.

26. The system as recited in claim 19, wherein the plurality of TKK's correspond to an application, wherein different ones of the plurality of TKK's are generated in response to a new instance of the application.

27. The system as recited in claim 19, wherein the memory is a volatile memory device, wherein contents of the memory are lost in response the memory not being refreshed within an allowable period of time.

28. A system comprising:
 a hardware processor;
 logic instructions stored on computer readable storage media and executable by the hardware processor, the logic instructions being configured to include:
 a communications shield agent to shield data in transit;
 a memory shield agent to shield data in memory;
 a storage shield agent to shield data at rest,
 wherein the communications shield agent, the memory shield agent, and the storage shield agent use at least one transformation knowledge key (TKK) to transform the data in memory, the data in transit, and the data at rest into M segments of shielded data, M being an integer; and
 a trusted agent operable in a trusted computing environment, wherein the trusted agent is configured to generate the at least one TKK, wherein the at least one TKK is configured to include transformation expressions, wherein the transformation expressions are configured to include transformation operators, the at least one TKK being configurable to include a nested instance of another TKK, the at least one TKK and the another TKK being configurable from a plurality of TKK's, wherein the trusted agent is configured to store at least one segment of the M segments of the shielded data in the trusted computing environment, wherein the at least one TKK is configured to include KNO transformation operators and parameters of shielding algorithms included in a library of shielding algorithms, wherein the another TKK of the plurality of TKK's is configured to include KNOS transformation operators and parameters of the shielding algorithms included in the library of shielding algorithms, wherein K represents an encryption operator, N represents a noise operator, O represents an order operator and S represents a split operator.

29. The system as recited in claim 28, wherein the communications shield agent, the memory shield agent, and the storage shield agent are configured to operate in an untrusted environment.

30. The system as recited in claim 28, wherein the at least one TKK used by the communications shield agent, the memory shield agent, and the storage shield agent is configured under control of a policy engine.

31. One or more non-transitory computer-readable storage media storing instructions that, when executed by one or more processors, cause the one or more processors to perform acts comprising:
   configuring a communications shield agent to shield data in transit;
   configuring a memory shield agent to shield data stored in volatile memory;
   configuring a storage shield to shield data at rest stored in a hard disk drive,
   wherein the communications shield agent, the memory shield agent, and the storage shield agent use at least one transformation knowledge key (TKK) to transform the data in memory, the data in transit, and the data at rest into M segments of shielded data, M being an integer; and
   configuring a trusted agent operable in a trusted computing environment, wherein the trusted agent is configured to generate the at least one TKK, wherein the at least one TKK is configured to include transformation expressions, wherein the transformation expressions are configured to include transformation operators, the at least one TKK being configurable to include a nested instance of another TKK, the at least one TKK and the another TKK being configurable from a plurality of TKK's, wherein the trusted agent is configured to store at least one segment of the M segments of the shielded data in the trusted computing environment, wherein the at least one TKK is configured to include KNO transformation operators and parameters of shielding algorithms included in a library of shielding algorithms, wherein the another TKK of the plurality of TKK's is configured to include KNOS transformation operators and parameters of the shielding algorithms included in the library of shielding algorithms, wherein K represents an encryption operator, N represents a noise operator, O represents an order operator and S represents a split operator.

32. The computer-readable storage media as recited in claim 31, wherein the communications shield agent, the memory shield agent, and the storage shield agent are configured to operate in an untrusted environment.

33. The computer-readable storage media as recited in claim 31, wherein the at least one TKK used by the communications shield agent, the memory shield agent, and the storage shield agent is configured under control of a policy engine.

34. The system as recited in claim 29, wherein appearance of the data in transit, the data in memory and the data at rest in plaintext form is eliminated in the untrusted environment.

35. The computer-readable storage media as recited in claim 31, wherein appearance of the data in transit, the data in memory and the data at rest in plaintext form is eliminated in the untrusted environment.

* * * * *